US012785260B2

(12) United States Patent
Chiang

(10) Patent No.: US 12,785,260 B2
(45) Date of Patent: Nov. 3, 2026

(54) ANTENNA MODULE AND METHOD FOR MANUFACTURING THE SAME

(71) Applicant: MEDIATEK INC., Hsinchu City (TW)

(72) Inventor: Chung-Hsin Chiang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 658 days.

(21) Appl. No.: 18/069,293

(22) Filed: Dec. 21, 2022

(65) Prior Publication Data

US 2023/0231305 A1 Jul. 20, 2023

Related U.S. Application Data

(60) Provisional application No. 63/299,453, filed on Jan. 14, 2022.

(51) Int. Cl.
*H01Q 1/48* (2006.01)
*H01Q 1/38* (2006.01)
*H01Q 1/50* (2006.01)

(52) U.S. Cl.
CPC ................. *H01Q 1/48* (2013.01); *H01Q 1/38* (2013.01); *H01Q 1/50* (2013.01)

(58) Field of Classification Search
CPC ............... H01Q 1/50; H01Q 1/38; H01Q 1/48
See application file for complete search history.

(56) References Cited

U.S. PATENT DOCUMENTS

| | | | | |
|---|---|---|---|---|
| 2018/0026342 | A1 | 1/2018 | Chen et al. | |
| 2020/0266519 | A1* | 8/2020 | Lee | H01Q 9/42 |
| 2021/0143526 | A1* | 5/2021 | Tate | H01Q 1/2283 |
| 2023/0030798 | A1 | 2/2023 | Chen | |

FOREIGN PATENT DOCUMENTS

| | | | |
|---|---|---|---|
| CN | 107645033 | A | 1/2018 |
| CN | 110870133 | A | 3/2020 |
| CN | 111430884 | A | 7/2020 |
| CN | 112018101 | A | 12/2020 |
| CN | 112103622 | A | 12/2020 |
| CN | 112201958 | A | 1/2021 |
| EP | 3 745 457 | A1 | 12/2020 |
| KR | 20190123194 | A | 10/2019 |
| WO | 2017/007075 | A1 | 1/2017 |
| WO | 2021/208785 | A1 | 10/2021 |

OTHER PUBLICATIONS

Extended European Search Report dated Jun. 19, 2023, issued in application No. EP 23151138.7.
Examination report dated Jul. 21, 2025, issued in European application No. EP 23151138.7.

* cited by examiner

*Primary Examiner* — Graham P Smith
(74) *Attorney, Agent, or Firm* — McClure, Qualey & Rodack, LLP

(57) ABSTRACT

An antenna module and a method for manufacturing an antenna module are provided. The antenna module includes a first dielectric substrate, a first antenna and a second antenna. The first dielectric substrate has a top surface, a bottom surface and a first side surface between the top surface and the bottom surface. The first antenna is formed on the top surface of the first dielectric substrate. The second antenna is formed on the first side surface of the first dielectric substrate.

25 Claims, 18 Drawing Sheets

ANTENNA MODULE AND METHOD FOR MANUFACTURING THE SAME

CROSS REFERENCE TO RELATED APPLICATIONS

This application claims the benefit of U.S. Provisional Application No. 63/299,453, filed Jan. 14, 2022, the entirety of which is incorporated by reference herein.

BACKGROUND OF THE INVENTION

Field of the Invention

The present invention relates to an antenna module and a method for manufacturing the same, and, in particular, to an edge fire antenna of an antenna module and a method for manufacturing the same.

Description of the Related Art

With the advancement of wireless communications technology, the performance of antennas is becoming more and more important. For example, in order to achieve 5G communications, an antenna must support high-frequency signals, and the antenna is expected to support radio communications in all directions. In order to improve communication with high-end smartphone applications, an antenna module having wide coverage and a small size is desirable.

BRIEF SUMMARY OF THE INVENTION

An embodiment of the present invention provides an antenna module. The antenna module includes a first dielectric substrate, a first antenna and a second antenna. The first dielectric substrate has a top surface, a bottom surface and a first side surface between the top surface and the bottom surface. The first antenna is formed on the top surface of the first dielectric substrate. The second antenna is formed on the first side surface of the first dielectric substrate.

An embodiment of the present invention provides a method for manufacturing an antenna module. The method includes providing a first dielectric substrate having a top surface and a bottom surface and a first side surface between the top surface and the bottom surface. The method further includes forming a first antenna on the top surface of the first dielectric substrate. The method further includes forming a conductive layer covering the entire first side surface. The method further includes removing a portion of the conductive layer to form a second antenna on the first side surface of the first dielectric substrate.

In addition, an embodiment of the present invention provides a method for manufacturing an antenna module. The method includes providing a dielectric substrate having a top surface and a bottom surface. The method further includes forming a first antenna on the top surface of the dielectric substrate. The method further includes forming a conductive feature in the dielectric substrate and extending from the top surface to the bottom surface. The method further includes dicing the dielectric substrate along a long axis of the conductive feature in a top view to form a second antenna on a side surface of the diced dielectric substrate, wherein the side surface is between a top surface and a bottom surface of the diced dielectric substrate.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
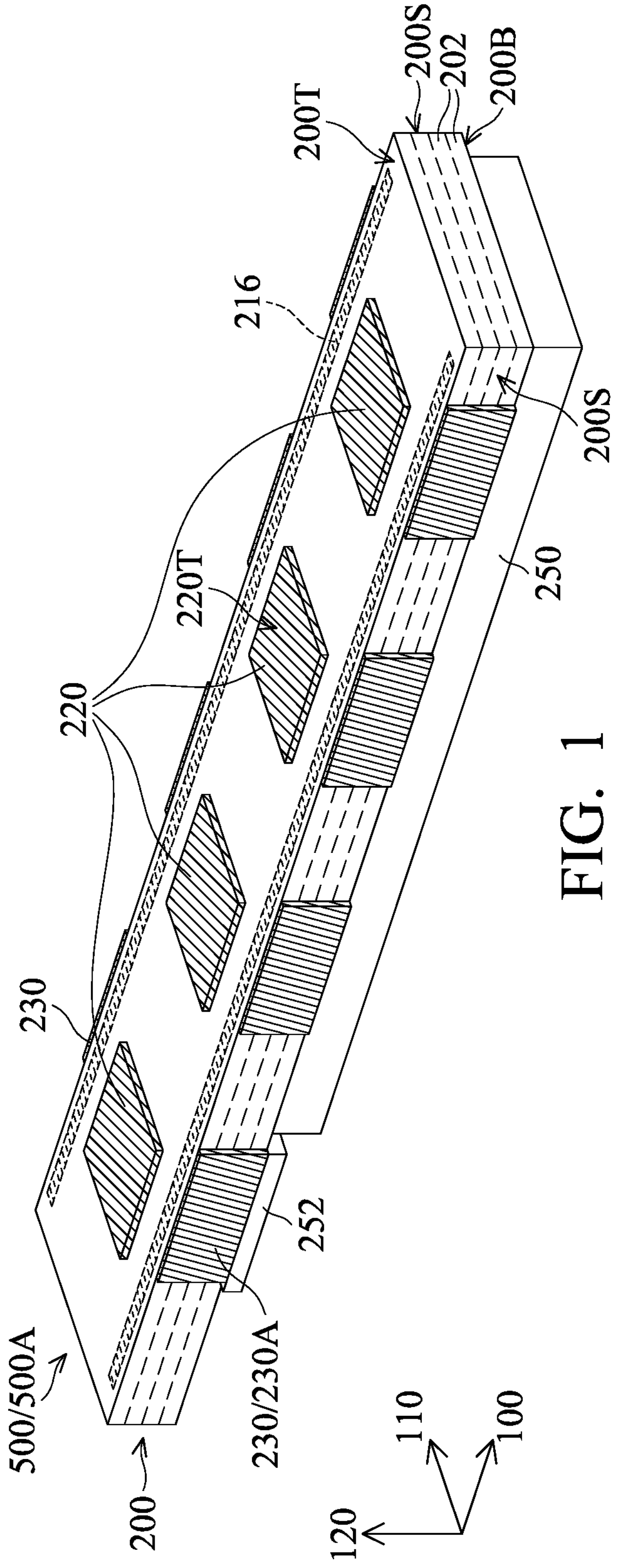
FIG. 1 is a perspective view of an antenna module in accordance with some embodiments of the disclosure.

The following description is made for the purpose of illustrating the general principles of the invention and should not be taken in a limiting sense. The scope of the invention is best determined by reference to the appended claims.

The inventive concept is described fully hereinafter with reference to the accompanying drawings, in which exemplary embodiments of the inventive concept are shown. The advantages and features of the inventive concept and methods of achieving them will be apparent from the following exemplary embodiments that will be described in more detail with reference to the accompanying drawings. It should be noted, however, that the inventive concept is not limited to the following exemplary embodiments, and may be implemented in various forms. Accordingly, the exemplary embodiments are provided only to disclose the inventive concept and let those skilled in the art know the category of the inventive concept. Also, the drawings as illustrated are only schematic and are non-limiting. In the drawings, the size of some of the elements may be exaggerated for illustrative purposes and not drawn to scale. The dimensions and the relative dimensions do not correspond to actual dimensions in the practice of the invention Embodiments provide an antenna module which integrates a broadside antenna array and an endfile antenna array on the top surface and a side surface of the same antenna substrate in order to reduce the fabrication cost and increase the coverage area of the antennas.

Figure 2:
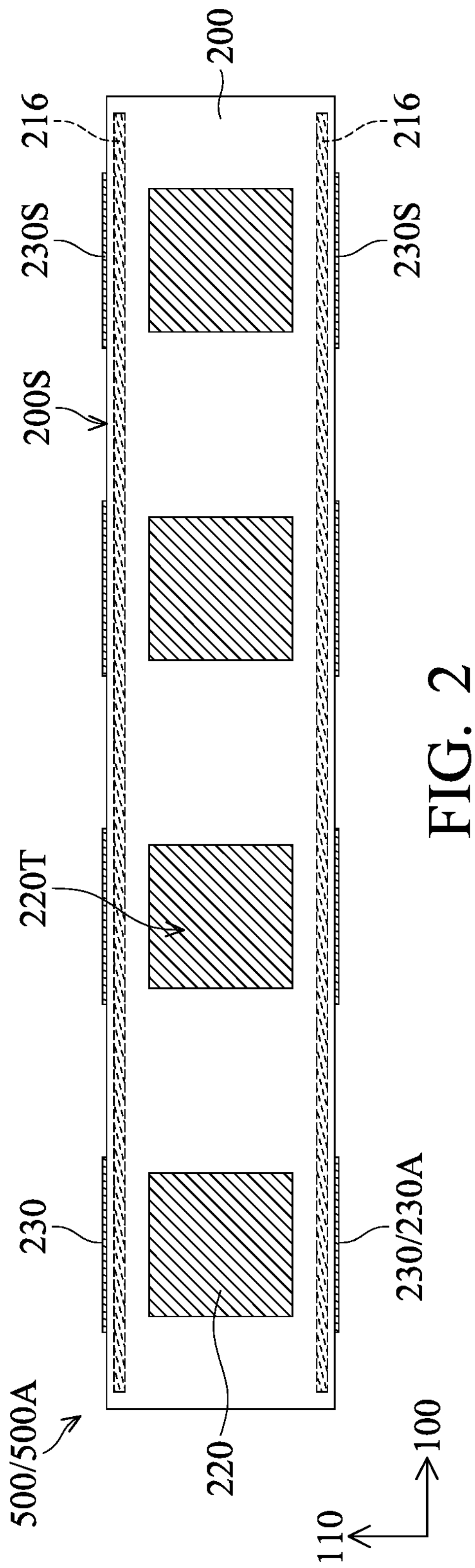
FIG. 2 is a top view of the antenna module shown in FIG. 1 in accordance with some embodiments of the disclosure.
Figure 3A:
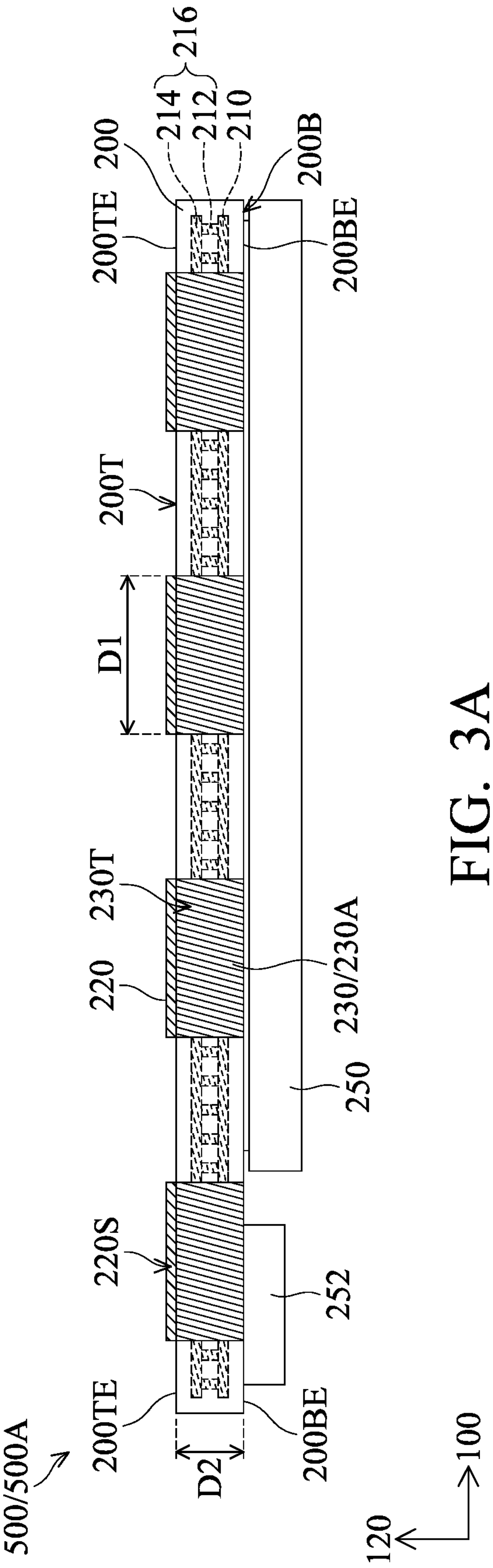
FIGS. 3A and 3B are side views of the antenna module shown in FIG. 1 in accordance with some embodiments of the disclosure.
Figure 3B:
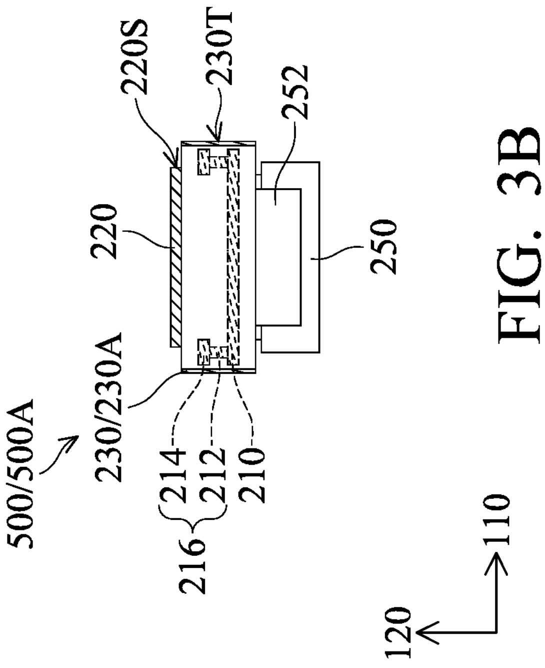

FIG. 1 is a perspective view of an antenna module 500 (including antenna modules 500A-500N, 500P-500U and 500W shown in the following figures) in accordance with some embodiments of the disclosure. FIG. 2 is a top view of the antenna module 500 shown in FIG. 1 in accordance with some embodiments of the disclosure. FIGS. 3A and 3B are side views of the antenna module 500 (including antenna modules 500A) along directions 100 and 110 shown in FIG. 1 in accordance with some embodiments of the disclosure. For illustration of the reference directions labeled in the figures, the direction 100 is defined as the length direction of the dielectric substrate 200, the direction 110 is defined as the width direction of the dielectric substrate 200, and a direction 120 is defined as the height direction of the dielectric substrate 200. The direction 100 is substantially perpendicular to the directions 110 and 120. The direction 110 is substantially perpendicular to the directions 100 and 120. The direction 120 is substantially perpendicular to the directions 100 and 110.

As shown in FIG. 1, the antenna module 500 includes a dielectric substrate 200, at least one antenna 220, at least one antenna 230, a grounding layer 210 and a reflector wall structure 216. The antenna module 500 may optionally include an electronic module 250 and a connector 252.

The dielectric substrate 200 has a top surface 200T, a bottom surface 200B and opposite side surfaces 200S adjacent to and between the top surface 200T and the bottom surface 200B. The dielectric substrate 200 may be single-layered structure or multi-layered structure. In some embodiments, the dielectric substrate 200 includes a stack of dielectric layers 202 formed of same or different materials and having same or different thicknesses. In some embodiments, the dielectric layer 202 is made of a material including FR4, FR5, BT, ceramic, glass, molding compound or liquid crystal polymer. In some embodiments, the dielectric substrate 200 includes electrical routings (not shown) composed of conductive layers and vias (not shown) formed in the dielectric substrate 200 for electrical connections.

The antennas 220 are formed on the top surface 200T of the dielectric substrate 200 and also serve as the top antennas 220. In some embodiments, the antennas 220 are separated from each other and periodically arranged as a row (or arranged in an array of 1×m, wherein m is integer equal to or greater than one) along a direction 100 (the length direction 100 of the dielectric substrate 200). The antenna 220 may cover a portion of the top surface 200T of the dielectric substrate 200. In addition, the antennas 220 are spaced apart to edges 200TE of the top surface 200T of the dielectric substrate 200. In some embodiments, the antennas 220 are broadside antennas including patch antennas, which means the antennas 220 radiate signals alone the direction 120.

The antennas 230 are formed on the side surfaces 200S of the dielectric substrate 200 and also serve as the sidewall antennas 230. In some embodiments, the antennas 230 are separated from each other and arranged as a row (or arranged in an array of 1×m, wherein m is integer equal to or greater than one) along the direction 100. The antenna 230 may cover a portion of the side surface 200S of the dielectric substrate 200. The antenna 230 may extend from the edge 200TE of the top surface 200T to an edge 200BE of the bottom surface 200B opposite the edge 200TE. In some embodiments, the antenna 230 covers both the edges 200TE and 200BE. In some other embodiments, the antenna 230 covers one of the edges 200TE and 200BE or does not cover both the edges 200TE and 200BE. In some embodiments, the top surface 220T of the antenna 220 is substantially parallel to a side surface 230S of the antenna 230 in the top view shown in FIG. 2. In some embodiments, a side surface 220S of the antenna 220 is substantially parallel to a top surface 230T of the antenna 230 in the side views shown in FIGS. 3A and 3B. In some embodiments, the antennas 230 do not overlap the antennas 220 in the top view shown in FIG. 2 and in the side views shown in FIGS. 3A and 3B. In some embodiments, the antennas 230 are edge fire antennas, which means the antennas 230 radiate signals along the direction 110 or the opposite direction of the direction 110. Examples of edge fire antennas include patch antennas, dipole antennas, and slot antennas.

The grounding layer 210 is disposed in the dielectric substrate 200 and below the antennas 220. The grounding layer 210 is formed between the dielectric layers 202 and separated from the antennas 220 and 230. In addition, the grounding layer 210 is formed inside the dielectric substrate 200 and is not exposed from the side surface 200S of the dielectric substrate 200. In some embodiments, the grounding layer 210 is exposed from the side surface 200S of the dielectric substrate 200. In some embodiments, the grounding layer 210 is disposed on the bottom surface 200B of the dielectric substrate 200. In some embodiments, the grounding layer 210 is isolated from the antennas 220 and the antennas 230. In some embodiments, the grounding layer 210 is connected to the antennas 220 and/or the antennas 230, which depends on antenna types or antenna design requirements, for example, antenna 230 is a PIFA antenna.

The reflector wall structure 216 is formed embedded in the first dielectric substrate 200 and electrically connected to the grounding layer 210. The reflector wall structure 216 extends parallel to the side surface 200S and between the top surface 200T and the bottom surface 200B. In other words, the reflector wall structure 216 extends along the direction 100 (i.e. the length direction of the dielectric substrate 200) and the direction 120 (i.e. the height direction of the dielectric substrate 200). In addition, the reflector wall structure 216 is isolated from the antennas 220 and the antennas 230. The reflector wall structure 216 is used to reflect electromagnetic waves from the antennas 230 and prevent the interference between the antennas 220 and the antennas 230. In some embodiments, the reflector wall structure 216 is connect to the antennas 220 and the antennas 230, which depends on antenna types or antenna design requirements, for example, antenna 230 is a PIFA antenna. In some embodiments, the reflector wall structure comprises vias 212 and a conductive line 214. The vias 212 disposed on the grounding layer 210 and passing through one or more dielectric layers 202. In addition, the vias 212 are arranged as a row extending along the direction 100 and close to the side surface 200S. The conductive line 214 is formed between the dielectric layers 202 and extends along the direction 100. In addition, the conductive line 214 covers and is electrically connected to the vias 212.

The electronic module 250 is disposed on the bottom surface 200B of the dielectric substrate 200. The electronic module 250 covers a portion of the bottom surface 200B. In addition, the electronic module 250 is electrically connected to the antennas 220 and the antennas 230 through the electrical routings. In some embodiments, the electronic module 250 comprises electrical components and/or circuits, such as a radio frequency integrated circuit (RFIC), an RLC circuit, a power management integrated circuit (PMIC), a resistor, an inductor, a capacitor or a combination thereof.

The connector 252 is disposed on the bottom surface 200B of the dielectric substrate 200. The connector 252 is disposed beside the electronic module 250 and covers another portion of the bottom surface 200B. In addition, the connector 252 is electrically connected to the electronic module 250 through the electrical routings. The antenna module 500 is electrically connected with an external component (not illustrated) through the connector 252, wherein the external component is, for example, a printed circuit board.

FIG. 3A also shows a side view of the antenna module 500A along the direction 100 in accordance with some embodiments of the disclosure, in which the reference numbers the same or similar to those in FIGS. 1, and 2 denote the same or similar elements. As shown in FIG. 3A, the antenna module 500A includes the antennas 230A on the side surface 200S and covering both the edges 200TE and 200BE. In some embodiments, the antenna 230A may be a dual-band antenna which can be operated in a first frequency band and a second frequency band that is different from the first frequency band. For example, the first frequency band has a first frequency range and the second frequency band has a second frequency range that is higher than the first range. For example, the first frequency band is a low frequency band between 24.25-29.5 GHz, and the second frequency band is a high frequency band between 37-43.5 GHz or/and 47.2-48.2 GHz. The antenna 230A may have a dimension D1 along the direction 100 and a dimension D2 along the direction 120. In some embodiments, the dimension D1 is equal to a half wavelength corresponding to the center frequency of the first frequency band. In addition, the dimension D2 is equal to a half wavelength corresponding to the center frequency of the second frequency band. In some embodiments, the dimension D1 is different from the dimension D2. For example, if the first frequency band is a low frequency band and the second frequency band is a high frequency band, the dimension D1 is greater than the dimension D2.

Figure 4:
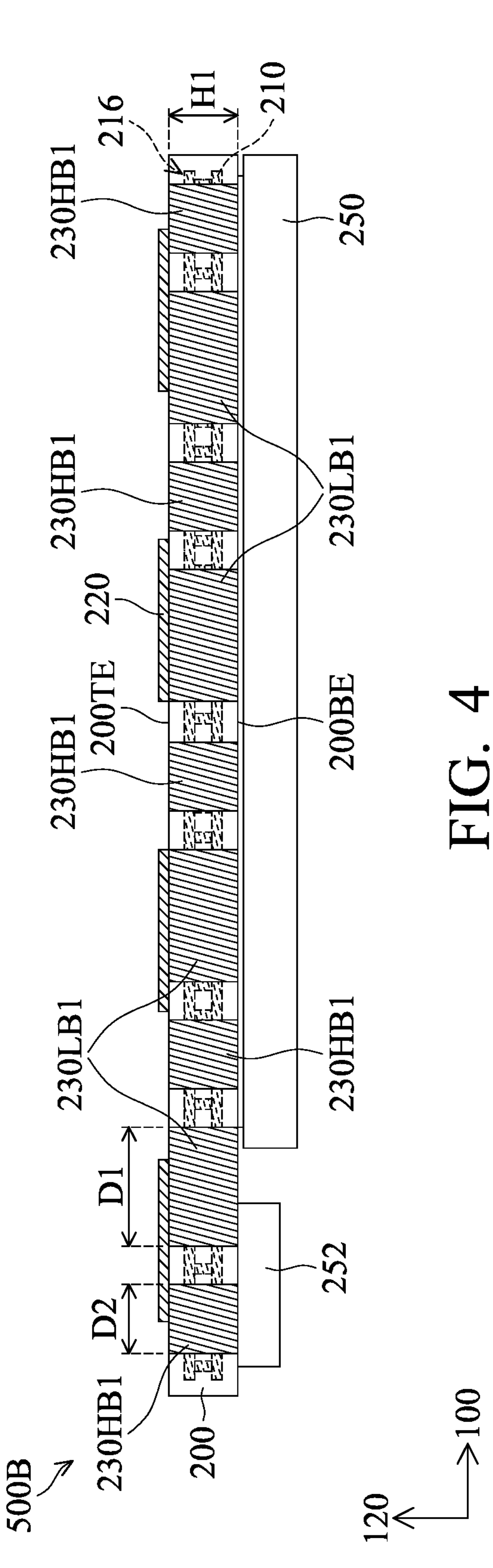
FIGS. 4-10 are side views of an antenna module in accordance with some embodiments of the disclosure.

FIG. 4 is a side view of an antenna module 500B along the direction 100 in accordance with some embodiments of the disclosure, in which the reference numbers the same or similar to those in FIGS. 1, 2, 3A and 3B denote the same or similar elements. As shown in FIG. 4, the difference between the antenna module 500B and the antenna module 500A is that the antenna module 500B includes antennas 230LB1 and antennas 230HB1 covering both the edges 200TE and 200BE. The antennas 230LB1 are formed beside and separated from the antennas 230HB1. In addition, the antennas 230LB1 are alternately arranged with the antennas 230HB1 along the direction 100. In some embodiments, each of the antennas 230LB1 is operated in a first frequency band and each of the antennas 230HB1 is operated in a second frequency band that is different from the first frequency band. For example, the first frequency band is a low frequency band and the second frequency band is a high frequency band that is higher than the low frequency band. The antenna 230LB1 may have the dimension D1 along the direction 100, and the antenna 230HB1 may have the dimension D2 along the direction 100. In some embodiments, the dimension D1 is equal to a half wavelength corresponding to the center frequency of the first frequency band. In addition, the dimension D2 is equal to a half wavelength corresponding to the center frequency of the second frequency band. In some embodiments, the dimension D1 is different from the dimension D2. For example, if the first frequency band is a low frequency band and the second frequency band is a high frequency band, the dimension D1 is greater than the dimension D2.

Figure 5:
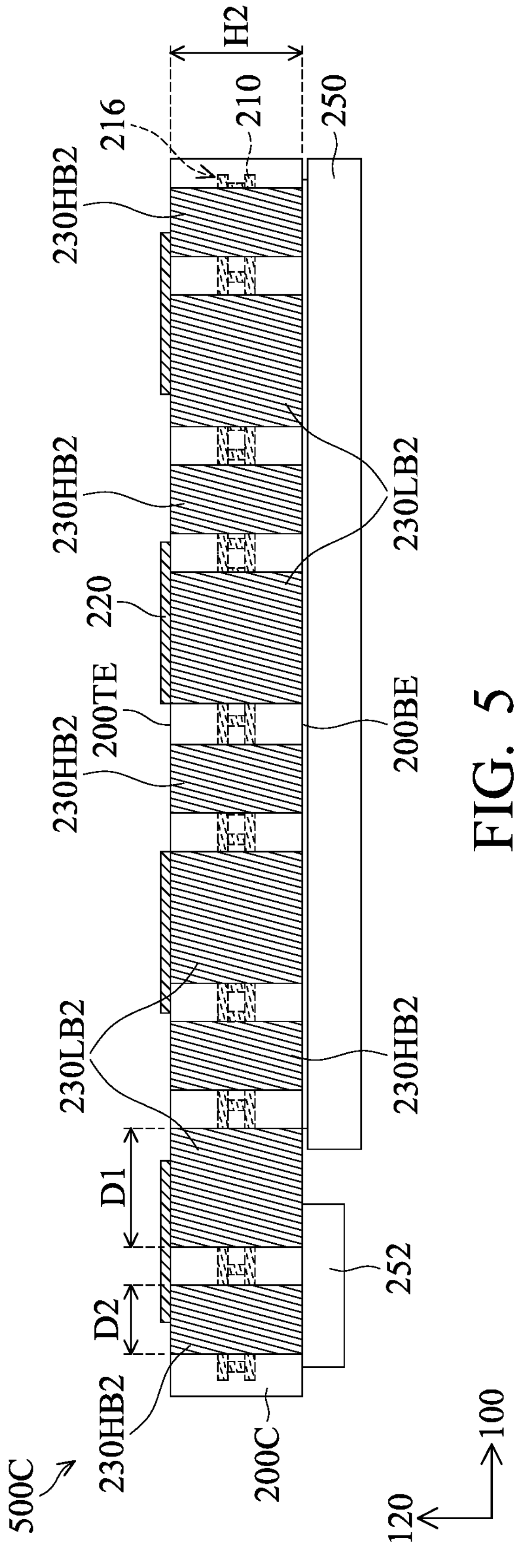

FIG. 5 is a side view of an antenna module 500C along the direction 100 in accordance with some embodiments of the disclosure, in which the reference numbers the same or similar to those in FIGS. 1, 2, 3A, 3B and 4 denote the same or similar elements. The difference between the antenna module 500C and the antenna module 500B is that the antenna module 500C includes a dielectric substrate 200C having a thickness H2 that is greater than a thickness H1 (FIG. 4) of the dielectric substrate 200. In addition, the antenna module 500C includes antennas 230LB2 and antennas 230HB2 covering both the edges 200TE and 200BE. The antennas 230LB2 are formed beside and separated from the antennas 230HB2. In addition, the antennas 230LB2 are alternately arranged with the antennas 230HB2 along the direction 100. In some embodiments, each of the antennas 230LB2 and each of the antennas 230HB2 are both dual-polarization antennas. The antenna 230LB2 may have the dimension D1 along the directions 100 and 120 (the dimension D1 may be equal to the thickness H2). The antennas 230HB2 may have the dimension D2 along the directions 100 and the dimension D1 along the direction 120.

Figure 6:
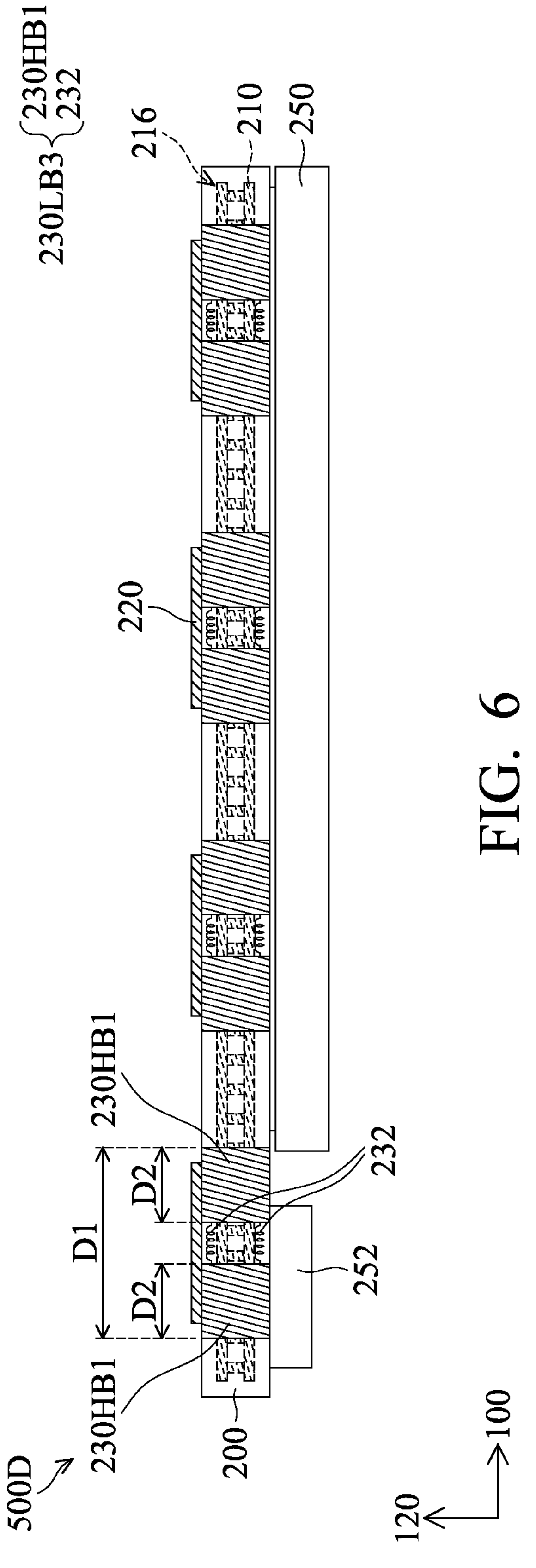

FIG. 6 is a side view of an antenna module 500D along the direction 100 in accordance with some embodiments of the disclosure, in which the reference numbers the same or similar to those in FIGS. 1, 2, 3A, 3B and 4-5 denote the same or similar elements. The difference between the antenna module 500D and the antenna module 500A is that the antenna module 500D includes at least one pair of antennas 230HB1 formed on the side surface 200S of the dielectric substrate 200. Each of the antennas 230HB1 may have the dimension D2 along the directions 100. The antenna 230HB1 may be a patch antenna. The antenna 230HB1 may be a single-polarization or dual-polarization antenna. In addition, the antenna module 500D further includes at least one passive component 232 disposed inside the dielectric substrate 200. In addition, the passive component 232 is electrically connected to the pair of antennas 230HB1. In some embodiments, the passive component 232 is an inductor or a filter. As show in FIG. 6, the passive component 232 and the pair of antennas 230HB1 collectively form a composite antenna 230LB3. The composite antenna 230LB3 may be a patch liked antenna. The composite antenna 230LB3 may be a single-polarization antenna. In some embodiments, the composite antenna 230LB3 has the dimension D1 along the directions 100. In some embodiments, the dimension D1 is greater than the dimension D2 (e.g. the dimension D1 is equal the total of the dimension of the pair of antennas 230HB1 and the gap of the pair of antennas 230HB1 along the directions 100). In some embodiments, the antenna 230HB1 is operated in a first frequency band and the composite antenna 230LB3 is operated in a second frequency band that is different from the first frequency band. For example, the first frequency band is a high frequency band and the second frequency band is a low frequency band that is lower than the high frequency band.

Figure 7:
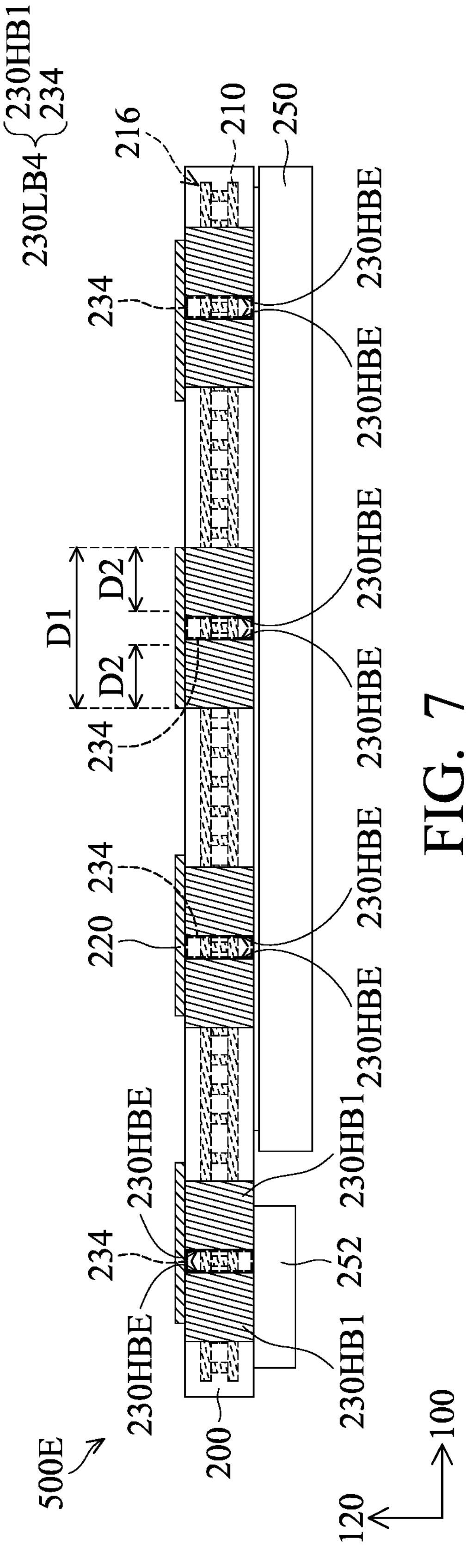

FIG. 7 is a side view of an antenna module 500E along the direction 100 in accordance with some embodiments of the disclosure, in which the reference numbers the same or similar to those in FIGS. 1, 2, 3A, 3B and 4-6 denote the same or similar elements. The difference between the antenna module 500E and the antenna module 500D is that the antenna module 500E includes a feeding line 234 disposed inside the dielectric substrate 200 and electrically connected to adjacent terminals 230HBE of the pair of antennas 230HB1. In addition, the antennas 230HB1 of the same pair are disposed close to each other. As show in FIG. 6, the feeding line 234 and the pair of second antennas 230HB1 collectively form a composite antenna 230LB4. The composite antenna 230LB4 may be a dipole antenna. In some embodiments, the antenna 230HB1 is operated in a first frequency band and the composite antenna 230LB4 is operated in a second frequency band that is different from the first frequency band. For example, the first frequency band is a high frequency band and the second frequency band is a low frequency band that is lower than the high frequency band.

Figure 8:
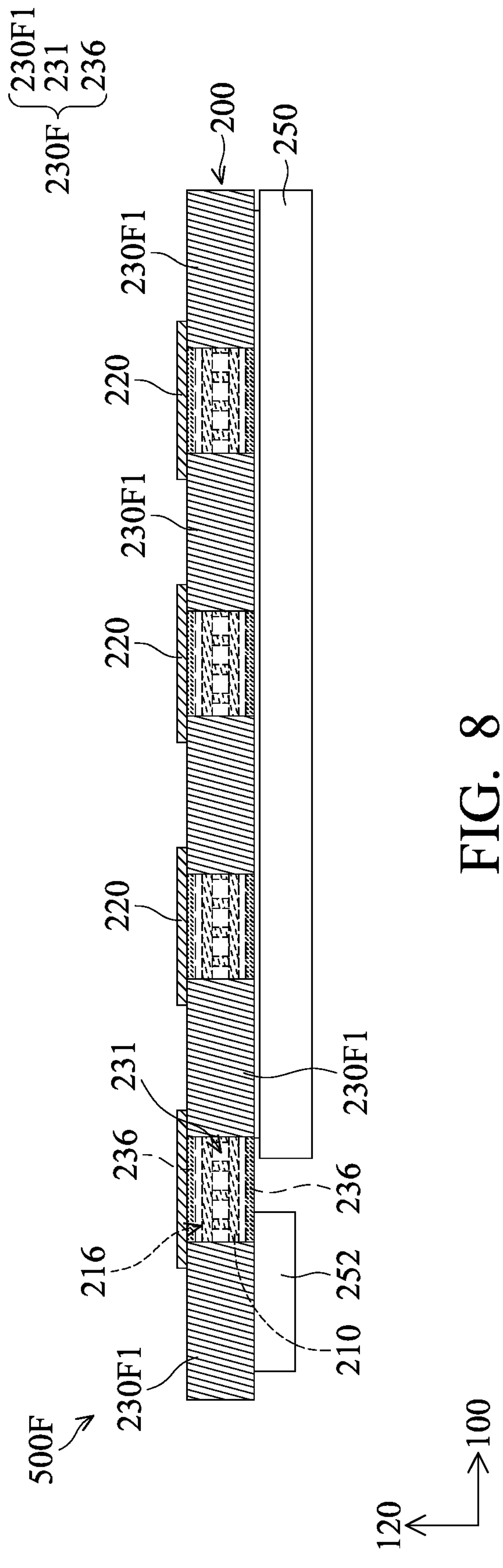

FIG. 8 is a side view of an antenna module 500F along the direction 100 in accordance with some embodiments of the disclosure, in which the reference numbers the same or similar to those in FIGS. 1, 2, 3A, 3B and 4-7 denote the same or similar elements. The difference between the antenna module 500F and the antenna module 500A is that the antenna module 500F includes at least a pair of antenna portions 230F1 and at least a pair of conductive lines 236. The pair of conductive lines 236 is disposed inside the dielectric substrate 200 and respectively close to the top surface 200T and the bottom surface 200B of the dielectric substrate 200. The pair of conductive lines 236 are electrically connected to the pair of antenna portions 230F1. As show in FIG. 8, the pair of conductive lines 236, the pair of antenna portions 230F1 and a slot 231 surrounded by the pair of conductive lines 236 and the pair of antenna portions 230F1 collectively form an antenna 230F. In some embodiments, the antenna 230F is a slot antenna. In some embodiments, the antenna 230F is a dual-band or multi-band antenna.

Figure 9:
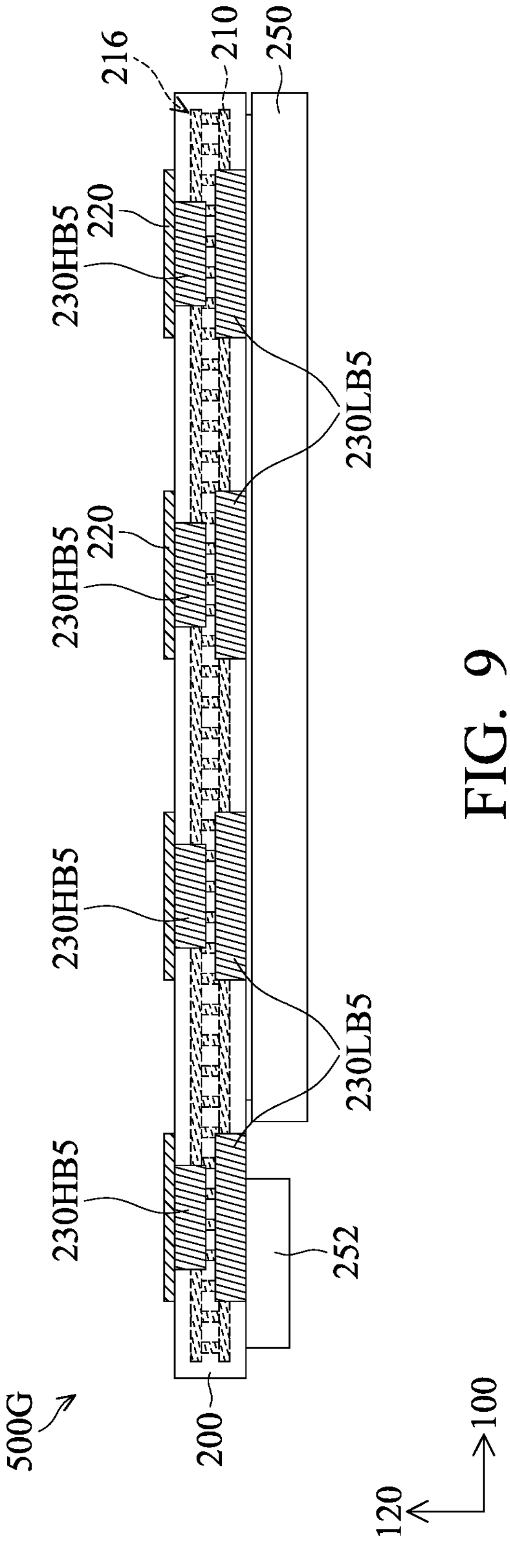

FIG. 9 is a side view of an antenna module 500G along the direction 100 in accordance with some embodiments of the disclosure, in which the reference numbers the same or similar to those in FIGS. 1, 2, 3A, 3B and 4-8 denote the same or similar elements. The difference between the antenna module 500G and the antenna module 500B is that the antenna module 500G includes antennas 230HB5 and 230LB5. In some embodiments, each of the antennas 230HB5 and 230LB5 covers one of the edges 200TE and 200BE. For example, the antenna 230HB5 covers the edge 230TE but does not cover the edge 230BE. The antenna 230LB5 covers the edge 230BE but does not cover the edge 230TE. In some embodiments, each of the antennas 230LB3 is operated in a first frequency band and each of the antennas 230HB3 is operated in a second frequency band that is higher than the first frequency band. In some embodiments, the antennas 230HB5 and 230LB5 are arranged along the direction 120 vertical to the top surface 200T of the dielectric substrate 200. In addition, the antennas 230HB5 and 230LB5 are aligned to each other along the direction 120.

Figure 10:
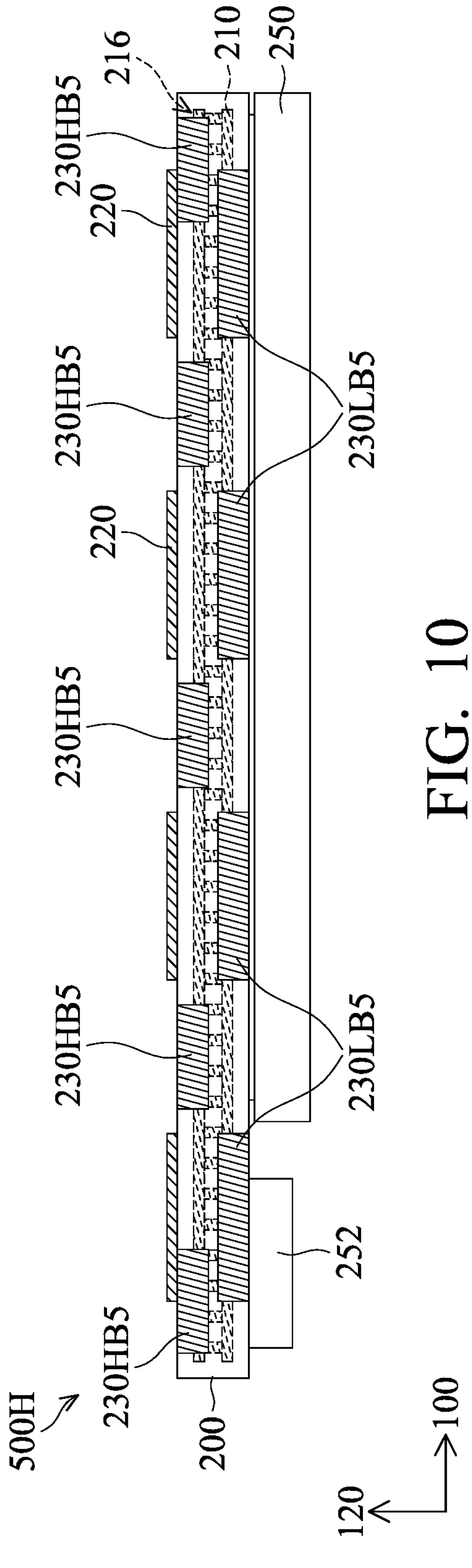

FIG. 10 is a side view of an antenna module 500H along the direction 100 in accordance with some embodiments of the disclosure, in which the reference numbers the same or similar to those in FIGS. 1, 2, 3A, 3B and 4-9 denote the same or similar elements. The difference between the antenna module 500H and the antenna module 500G is that the antennas 230HB5 and 230LB5 of the antenna module 500H are arranged in a staggered manner along the direction 100 parallel to the top surface 200T of the dielectric substrate 200. In this embodiment, the antenna module 500G may suppress interference between the antennas 230HB5 and 230LB5.

Figure 11:
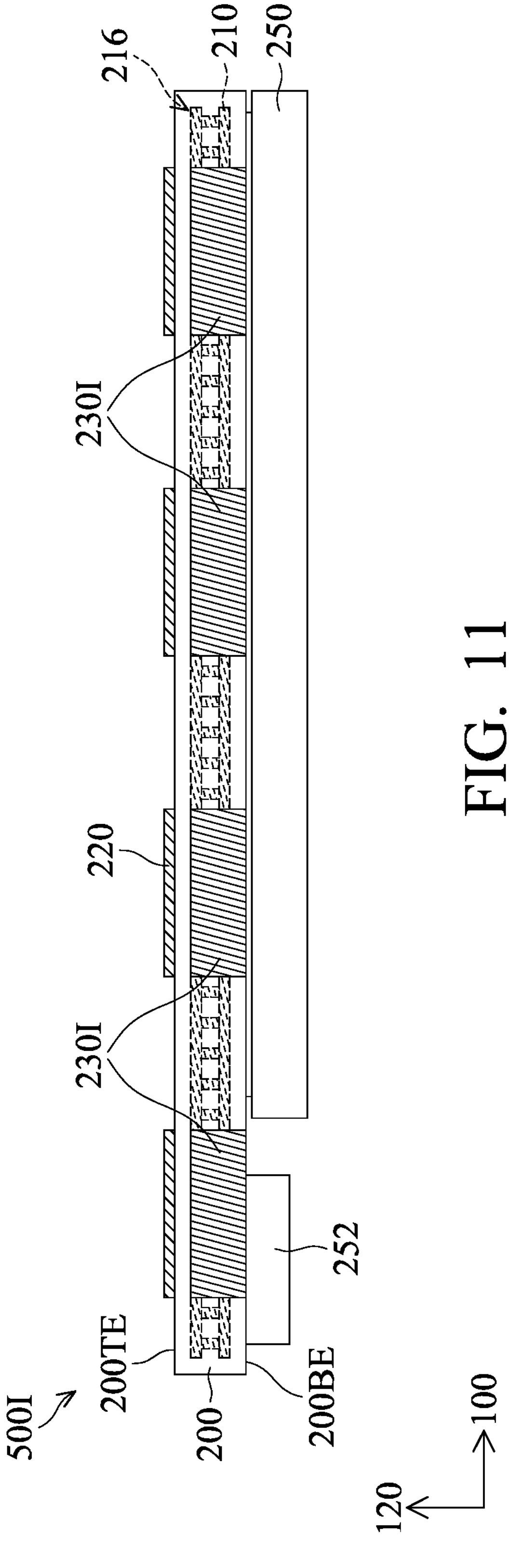
FIG. 11 is a side view of an antenna module in accordance with some embodiments of the disclosure.
Figure 12C:
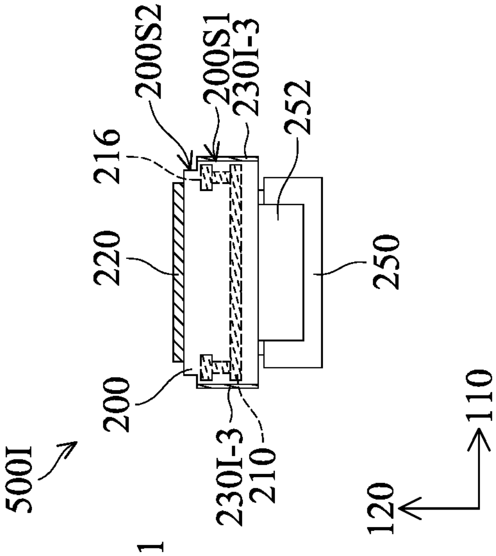
FIGS. 12A, 12B and 12C are side views of the antenna module shown in FIG. 11 in accordance with some embodiments of the disclosure.
Figure 12B:
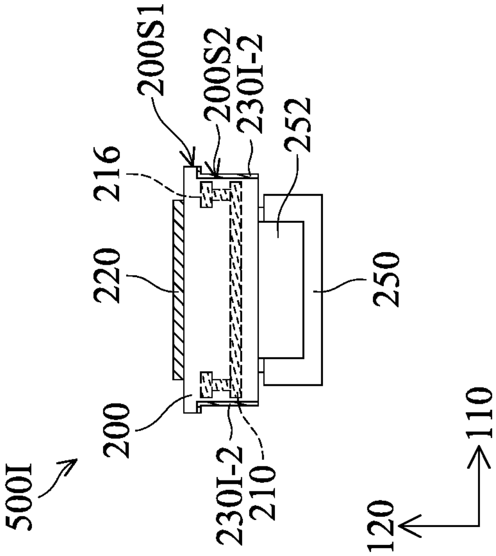
Figure 12A:
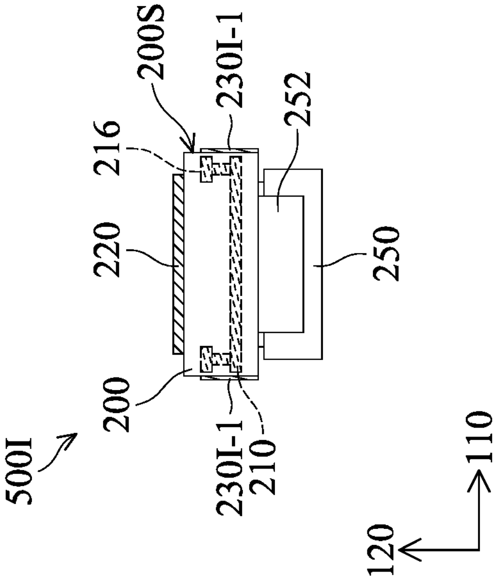

FIG. 11 is a side view of an antenna module 500I along the direction 100 in accordance with some embodiments of the disclosure. FIGS. 12A, 12B and 12C are side views of the antenna module 500I along the direction 110 in accordance with some embodiments of the disclosure. The reference numbers the same or similar to those in FIGS. 1, 2, 3A, 3B and 4-10 denote the same or similar elements. The difference between the antenna module 500I and the antenna module 500A is that the antenna module 500I includes antennas 230I (including antennas 230I-1, 230I-2 and 230I-3 shown in FIGS. 12A, 12B and 12C) formed on the side surface 200S of the dielectric substrate 200. Each of the antennas 230I covers one of the edges 200TE and 200BE. For example, the antenna 230I covers the edge 230BE but does not cover the edge 230TE.

As shown in FIG. 12A, the side surface 200S of the dielectric substrate 200 is a planar surface. In addition, the antenna 230I-1 is formed on the side surface 200S close to the bottom surface 200B.

As shown in FIG. 12B, the dielectric substrate 200 has a side surface 200S 1 adjacent to the top surface 200T and a side surface 200S2 adjacent to the bottom surface 200B and the side surface 200S1. The side surface 200S1 is not aligned with the side surface 200S2. For example, the side surface 200S1 is outside the side surface 200S2 in a side view as shown in FIG. 12B. In addition, the antenna 230I-2 may be formed on the side surface 200S2.

As shown in FIG. 12C, the dielectric substrate 200 has the side surface 200S1 adjacent to the bottom surface 200B and the side surface 200S2 adjacent to the top surface 200T and the side surface 200S1. The side surface 200S1 is not aligned with the side surface 200S2. For example, the side surface 200S1 is outside the side surface 200S2 in a side view as shown in FIG. 12C. In addition, the antenna 230I-3 may be formed on the side surface 200S1.

Figure 13:
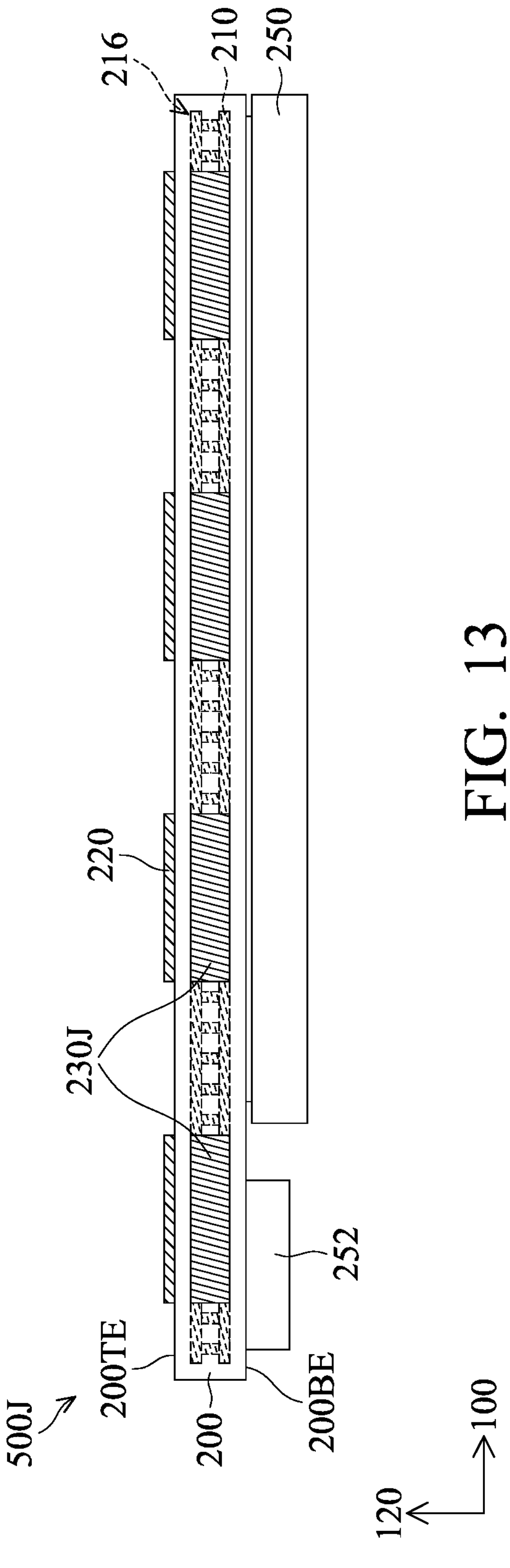
FIG. 13 is a side view of an antenna module in accordance with some embodiments of the disclosure.
Figure 14A:
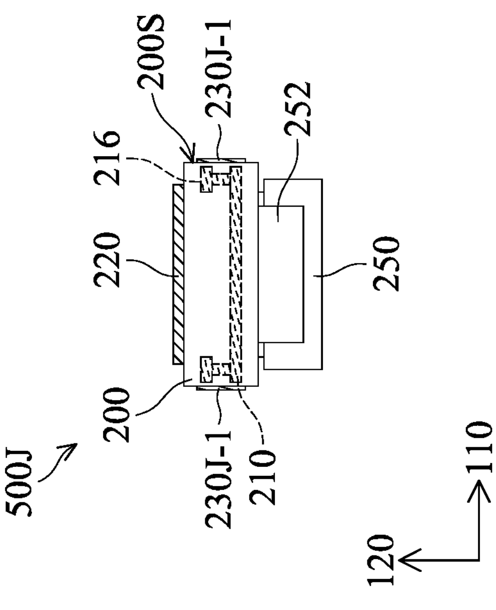
FIGS. 14A, 14B and 14C are side views of the antenna module shown in FIG. 13 in accordance with some embodiments of the disclosure.
Figure 14B:
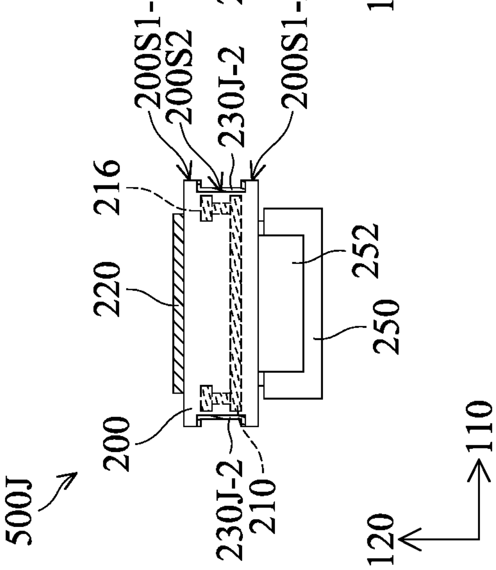
Figure 14C:
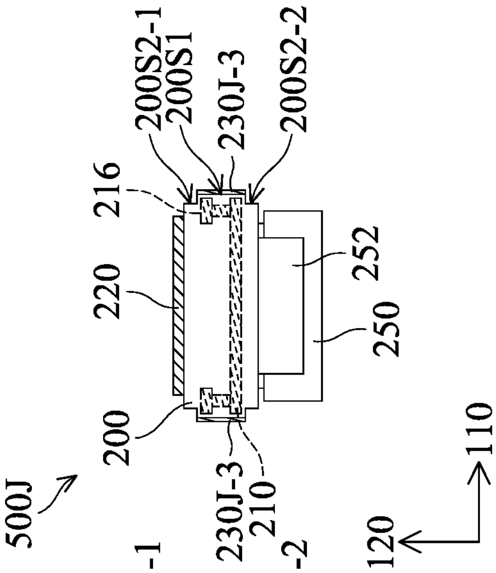

FIG. 13 is a side view of an antenna module 500J along the direction 100 in accordance with some embodiments of the disclosure. FIGS. 14A, 14B and 14C are side views of the antenna module 500J along the direction 110 in accordance with some embodiments of the disclosure. The reference numbers the same or similar to those in FIGS. 1, 2, 3A, 3B, 4-11, 12A, 12B and 12C denote the same or similar elements. The difference between the antenna module 500J and the antenna module 500I is that the antenna module 500J includes antennas 230J (including antennas 230J-1, 230J-2 and 230J-3 shown in FIGS. 14A, 14B and 14C) formed on the side surface 200S of the dielectric substrate 200. Each of the antennas 230J does not cover both the edges 200TE and 200BE.

As shown in FIG. 14A, the side surface 200S of the dielectric substrate 200 is a planar surface. In addition, the antenna 230J-1 is formed on a central portion of the side surface 200S.

As shown in FIG. 14B, the dielectric substrate 200 has a side surface 200S1-1 adjacent to the top surface 200T, a side surface 200S1-2 adjacent to the bottom surface 200B and the side surface 200S2 between and adjacent to the side surfaces 200S1-1 and 200S1-2. The side surfaces 200S1-1 and 200S1-2 are aligned to each other. In addition, the side surfaces 200S1-1 and 200S1-2 are not aligned with the side surface 200S2. For example, the side surfaces 200S1-1 and 200S1-2 are outside the side surface 200S2 in a side view as shown in FIG. 14B. In addition, the antenna 230J-2 may be formed on the side surface 200S2.

As shown in FIG. 14C, the dielectric substrate 200 has the dielectric substrate 200 has a side surface 200S2-1 adjacent to the top surface 200T, a side surface 200S2-2 adjacent to the bottom surface 200B and the side surface 200S1 between and adjacent to the side surfaces 200S2-1 and 200S2-2. The side surfaces 200S2-1 and 200S2-2 are aligned to each other.

In addition, the side surface 200S1 is not aligned with the side surfaces 200S2-1 and 200S2-2. For example, the side surface 200S1 is outside the side surfaces 200S2-1 and 200S2-2 in a side view as shown in FIG. 14C. In addition, the antenna 230J-3 may be formed on the side surface 200S1.

Figure 15A:
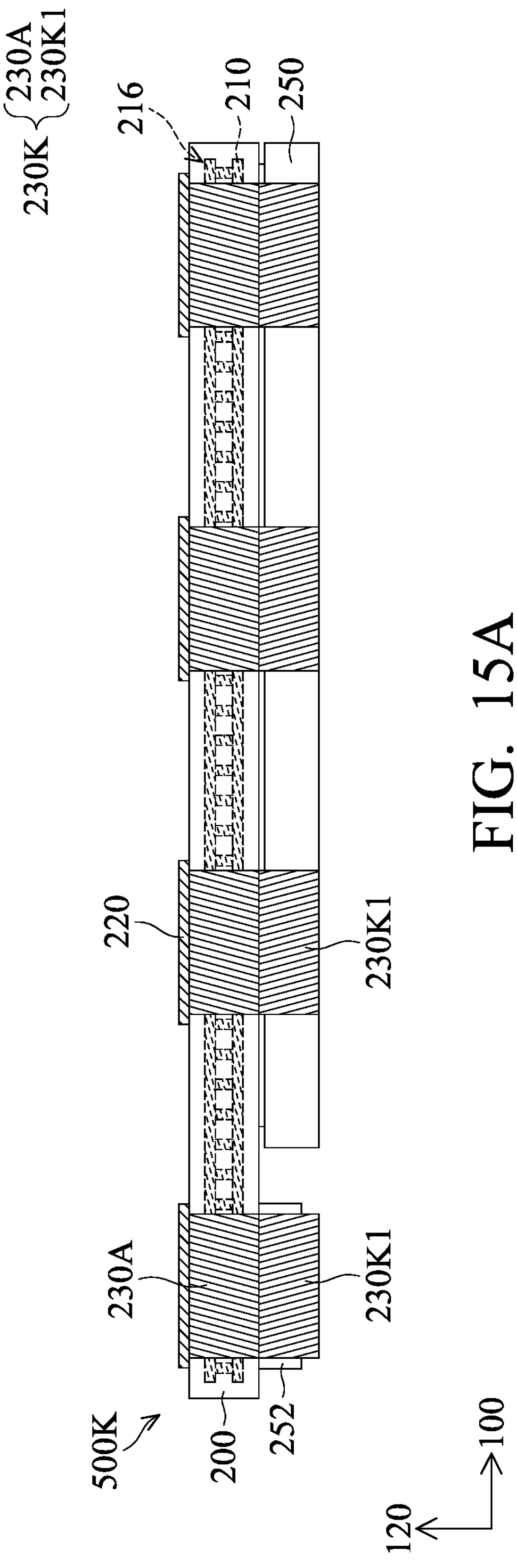
FIGS. 15A and 15B are side views of an antenna module in accordance with some embodiments of the disclosure.
Figure 15B:
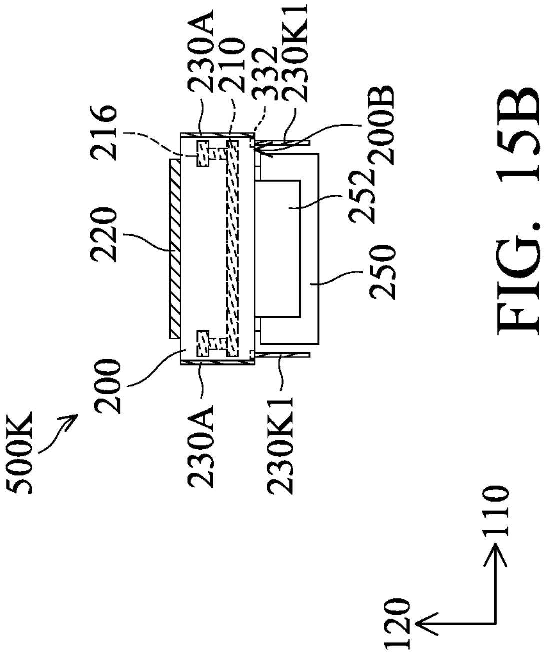

FIG. 15A is a side view of an antenna module 500K along the direction 100 in accordance with some embodiments of the disclosure. FIG. 15B a side view of the antenna module 500K along the direction 110 in accordance with some embodiments of the disclosure. The reference numbers the same or similar to those in FIGS. 1, 2, 3A, 3B, 4-11, 12A, 12B, 12C, 13, 14A, 14B and 14C denote the same or similar elements. The difference between the antenna module 500K and the antenna module 500A is that the antenna module 500K includes a conductive sheet 230K1 disposed on a pad 332 on the bottom surface 200B of the dielectric substrate 200. In addition, the conductive sheet 230K1 extends along the direction 120 vertical to the bottom surface 200B of the dielectric substrate 200. The conductive sheet 230K1 may be separated from the electronic module 250 and the connector 252. In some embodiments, the conductive sheet 230K1 is electrically connected to the antenna 230A through the pad 332 and the routings (not shown). In this embodiment, the conductive sheet 230K1 and the antenna 230A collective form an antenna 230K with a larger area.

Figure 16:
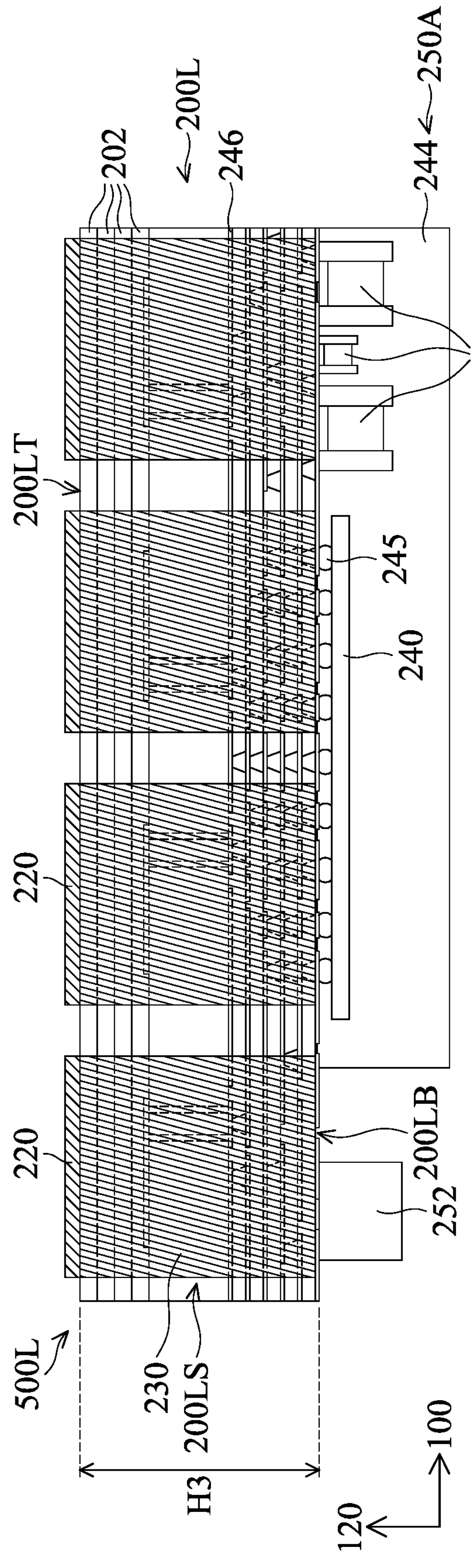
FIGS. 16-25 are side views of an antenna module in accordance with some embodiments of the disclosure.

FIG. 16 is a side view of an antenna module 500L along the direction 100 in accordance with some embodiments of the disclosure. The reference numbers the same or similar to those in FIGS. 1, 2, 3A, 3B, 4-11, 12A, 12B, 12C, 13, 14A, 14B, 14C, 15A and 15B denote the same or similar elements. For illustration of electrical routings 246, the grounding layer 210 and the reflector wall structure 216 is not shown in FIG. 16. The difference between the antenna module 500L and the antenna module 500A is that the antenna module 500L includes a dielectric substrate 200L and an electronic module 250A.

In some embodiments, the dielectric substrate 200L is a multi-layered package substrate including the stacked dielectric layers 202 made by same or different materials. The dielectric substrate 200L includes the electrical routings 246 composed of conductive layers and vias (not shown) formed in the dielectric substrate 200L for electrical connections. In some embodiments, the electrical routings 246 are electrically connected to, for example, the antennas 220 and 230, passive components (e.g. the passive components 232 shown in FIG. 6), feeding lines (e.g. the feeding lines 234 shown in FIG. 7), conductive sheets (e.g. the conductive sheet 230K1 shown in FIGS. 15A and 15B) or other applicable electronic components. In some embodiments, the thickness H3 of the dielectric substrate 200L is equal to or greater than the thickness H1 of the dielectric substrate 200 (FIG. 4) in order to arrange the electrical routings 246.

In this embodiment, the electronic module 250A includes electronic components 240 and 241, a molding compound 244 and at least one conductive bump structure 245. The electronic components 240 and 241 are disposed on a bottom surface 200LB of the dielectric substrate 200L. In addition, the electronic component 240 is electrically connected to the antennas 220 and 230 through the electrical routings 246. As shown in FIG. 16, the electronic component 240 is electrically connected to the electrical routings 246 through the conductive bump structures 245. In some embodiments, the electronic components 240 and 241 are different electronic components. For example, the electronic component 240 is, for example, RFIC. The second electronic component 241 may be a passive component such as a resistor, an inductor, or a capacitor. In some embodiments, the conductive bump structure 245 includes a solder ball, solder paste, or a conductive pillar, for example.

The connector 252 is mounted on the bottom surface 200LB of the dielectric substrate 200L and beside the electronic module 250A. In addition, the connector 252 is electrically connected to the electronic module 250A through the electrical routings 246. The antenna module 500L is electrically connected with an external component (not illustrated) through the connector 252.

The molding compound 244 is formed on and in contact with a portion of the bottom surface 200LB of the dielectric substrate 200L. The molding compound 244 covers and encapsulates the electronic components 240 and 241 but not covers the connector 252. In some embodiments, the molding compound 244 is made of a material including, for example, a Novolac-based resin, an epoxy-based resin, a silicone-based resin, or another suitable encapsulant. The molding compound 244 may include suitable fillers, such as powdered $SiO_2$. The molding compound 244 can be applied using any of a number of molding techniques, such as compression molding, injection molding, or transfer molding.

As shown in FIG. 16, the dielectric substrate 200L, the antennas 220 and 230, the electronic module 250A and the connector 252 collectively form an antenna package (i.e. the antenna module 500L is an antenna package). The antennas 220 and 230 are respectively formed on a top surface 200LT and adjacent side surfaces 200LS of the dielectric substrate (package substrate) 200L.

Figure 17:
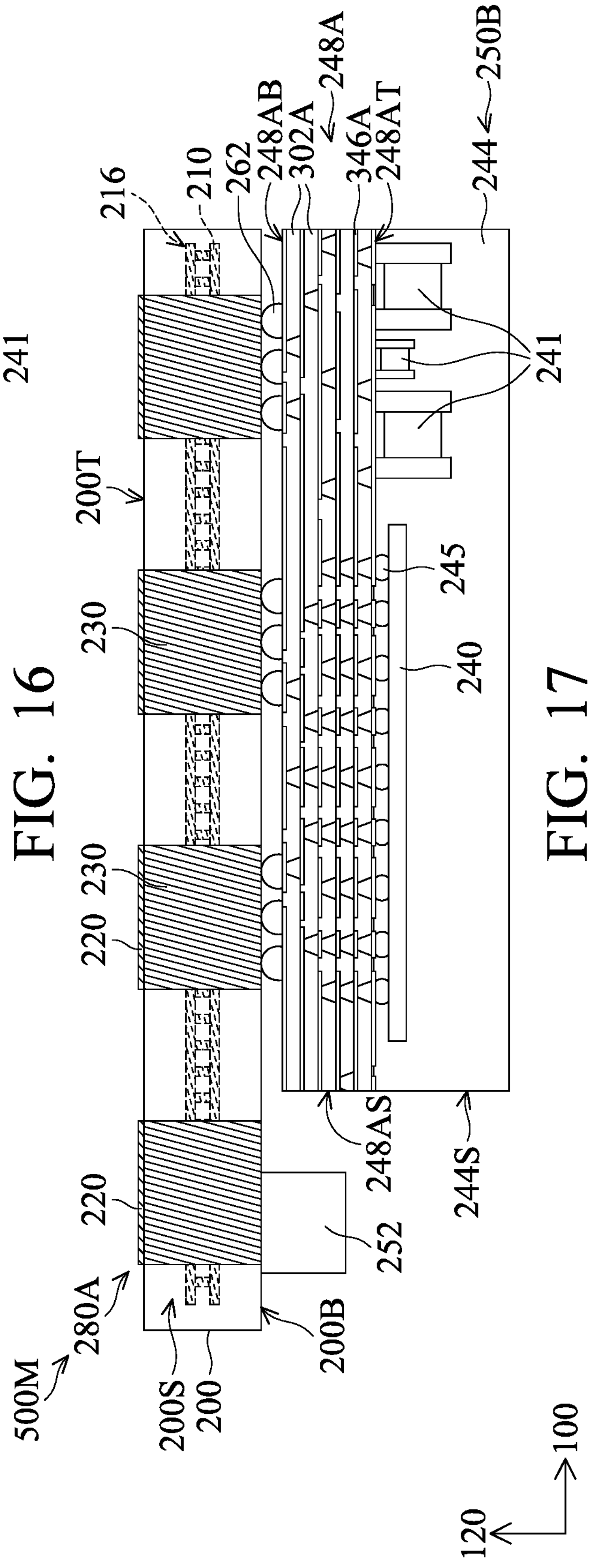

FIG. 17 is a side view of an antenna module 500M along the direction 100 in accordance with some embodiments of the disclosure. The reference numbers the same or similar to those in FIGS. 1, 2, 3A, 3B, 4-11, 12A, 12B, 12C, 13, 14A, 14B, 14C, 15A, 15B and 16 denote the same or similar elements. The difference between the antenna module 500M and the antenna module 500A is that the antenna module 500M is a package-on-package (PoP) package assembly including an antenna package 280A and an electronic module 250B.

In this embodiment, the antenna package 280A includes the dielectric substrate 200, the antennas 220 and 230. The antennas 220 and 230 are respectively formed on the top surface 200T and the adjacent side surface 200S of the dielectric substrate (package substrate) 200.

The electronic module 250B may be a semiconductor package, for example, a surface-mount technology (SMT) package, including a dielectric substrate 248A, the electronic components 240 and 241, the molding compound 244 and the conductive bump structure 245. In addition, the electronic module 250B is mounted on the antenna package 280A through conductive bump structures 262. Furthermore, the connector 252 is mounted on the antenna package 280A and beside the electronic module 250B.

The dielectric substrate 248A of the electronic module 250B is disposed between the bottom surface 200B of the dielectric substrate 200 and the electronic components 240 and 241. In addition, the dielectric substrate 248A and the connector 252 overlaps different portions of the bottom surface 200B of the first dielectric substrate 200. In some embodiments, the dielectric substrate 248A is a multi-layered package substrate including the stacked dielectric layers 302A made by same or different materials. The dielectric substrate 248A includes electrical routings 346A composed of conductive layers and vias (not shown) formed in the dielectric substrate 248A for electrical connections between the antennas 220 and 230 and the electronic components 240 and between the electronic components 240 and 241.

The electronic components 240 and 241 of the electronic module 250B and the conductive bump structures 262 are disposed on opposite surfaces 248AT and 248AB of the dielectric substrate 248A.

The molding compound 244 of the electronic module 250B fully covers the surface 248AT of the dielectric substrate 248A. In addition, side surfaces 244S are aligned to corresponding side surfaces 248AS of the dielectric substrate 248A.

Figure 18:
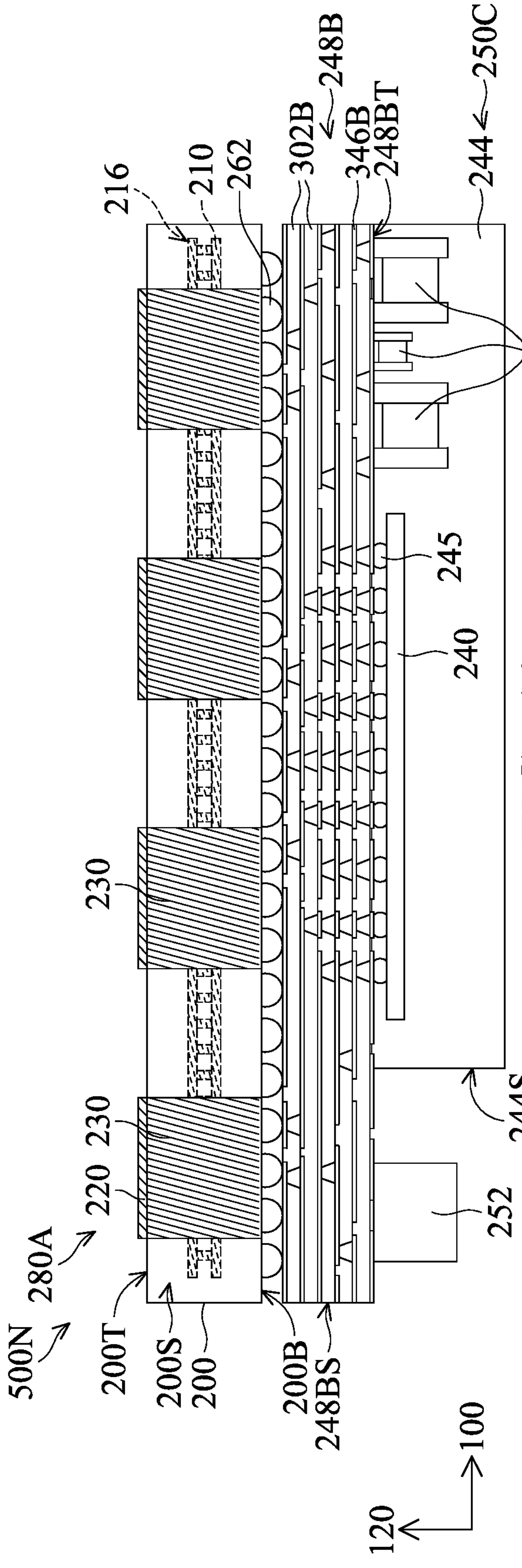

FIG. 18 is a side view of an antenna module 500N along the direction 100 in accordance with some embodiments of the disclosure. The reference numbers the same or similar to those in FIGS. 1, 2, 3A, 3B, 4-11, 12A, 12B, 12C, 13, 14A, 14B, 14C, 15A, 15B, 16 and 17 denote the same or similar elements. The difference between the antenna module 500N and the antenna module 500M is that the antenna module 500N is a package-on-package (PoP) package assembly including the antenna package 280A stacked on an electronic module 250C.

In this embodiment, the electronic module 250C may be a semiconductor package, for example, a surface-mount technology (SMT) package, including a dielectric substrate 248B, the electronic components 240 and 241, the molding compound 244 and the conductive bump structure 245. In addition, the antenna package 280A is mounted on the electronic module 250C through the conductive bump structures 262. Furthermore, the connector 252 is mounted on the dielectric substrate 248B and beside the electronic components 240, 241.

The dielectric substrate 248B of the electronic module 250C fully covers the bottom surface 200B of the dielectric substrate 200. In addition, the dielectric substrate 248B is disposed between the bottom surface 200B of the dielectric substrate 200 and the connector 252. In some embodiments, the dielectric substrate 248B is a multi-layered package substrate including the stacked dielectric layers 302B made by same or different materials. The dielectric substrate 248B includes electrical routings 346B composed of conductive layers and vias (not shown) formed in the dielectric substrate 248B for electrical connections between the antennas 220 and 230 and the electronic components 240 and between the electronic components 240 and 241 and the connector 252.

The electronic components 240 and 241 of the electronic module 250C are disposed on a surface 248BT of the dielectric substrate 248B. The molding compound 244 of the electronic module 250C encapsulates the electronic components 240 and 241 and partially covers the surface 248BT of the dielectric substrate 248B. In some embodiments, the side surface 244S is not aligned to a corresponding side surface 248BS of the dielectric substrate 248B.

Figure 19:
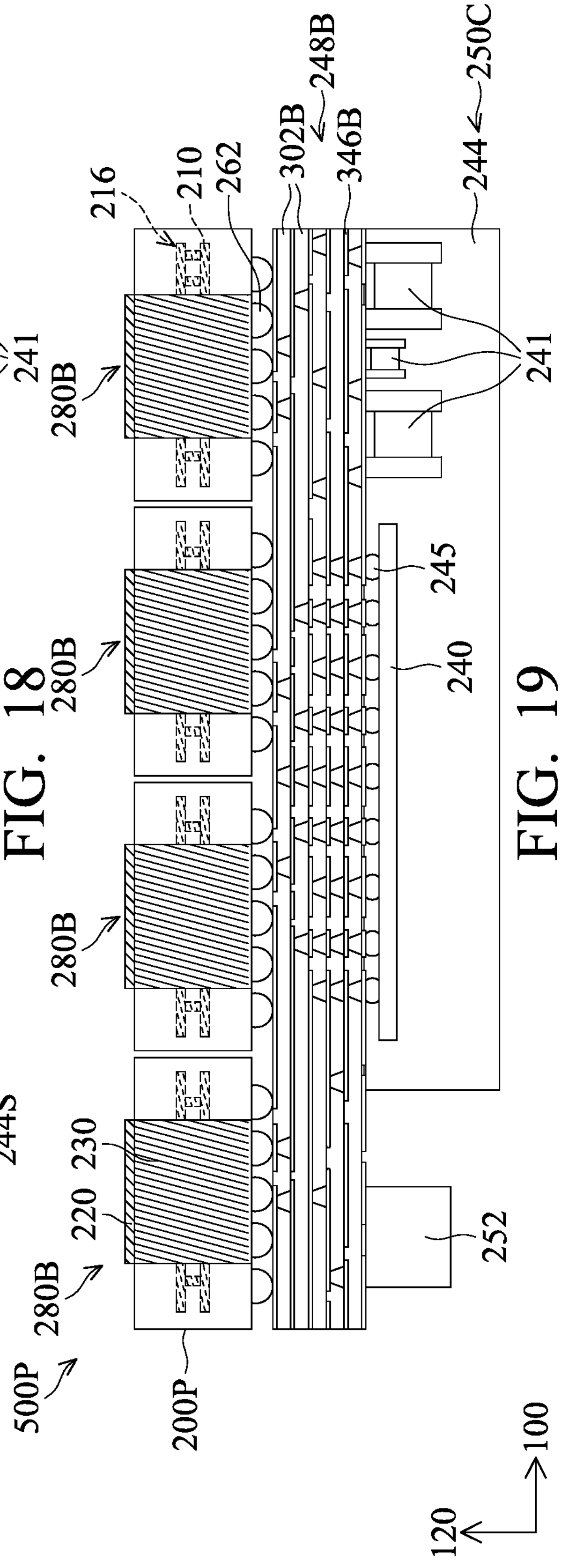

FIG. 19 is a side view of an antenna module 500P along the direction 100 in accordance with some embodiments of the disclosure. The reference numbers the same or similar to those in FIGS. 1, 2, 3A, 3B, 4-11, 12A, 12B, 12C, 13, 14A, 14B, 14C, 15A, 15B and 16-18 denote the same or similar elements. The difference between the antenna module 500P and the antenna module 500N is that the antenna module 500P is a package-on-package (PoP) package assembly including discrete antenna packages 280B arranged side by side and stacked on the dielectric substrate 248B of the electronic module 250C. The electronic module 250C (e.g., SMT package) may individually control each of the antenna packages 280B. In this embodiment, each of the antenna packages 280B includes the dielectric substrate 200P, the antennas 220 and 230 and the conductive bump structure 262. In some embodiments, the dielectric substrate 200P and 200 may comprise the same or similar materials and structures.

Figure 20:
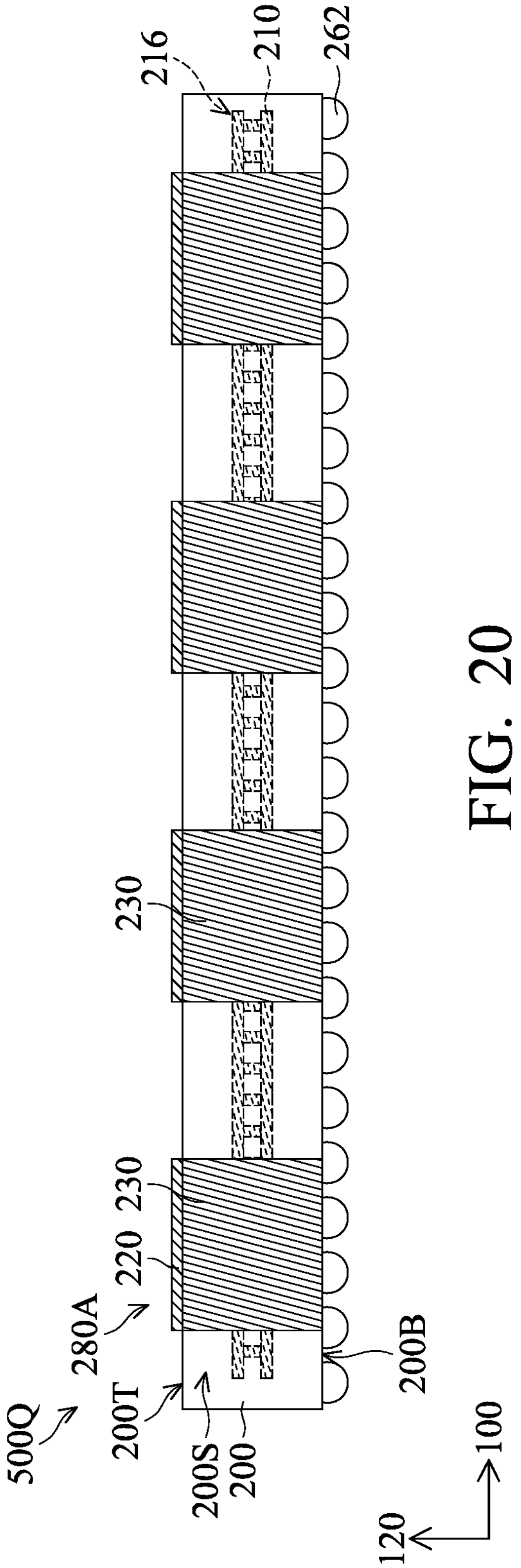

FIG. 20 is a side view of an antenna module 500Q along the direction 100 in accordance with some embodiments of the disclosure. The reference numbers the same or similar to those in FIGS. 1, 2, 3A, 3B, 4-11, 12A, 12B, 12C, 13, 14A, 14B, 14C, 15A, 15B and 16-19 denote the same or similar elements. The difference between the antenna module 500Q and the antenna module 500M is that the antenna module 500Q is an antenna package without the electronic components 240 and 241 and the connector 252 (FIG. 1). The antenna module 500Q is composed of the antenna package 280A including the dielectric substrate 200, the antennas 220 and 230 and the conductive bump structures 262. In this embodiment, the antenna module 500Q is electrically connected with an external component (e.g., a printed circuit board) without using the connector 252 (FIG. 1).

Figure 21:
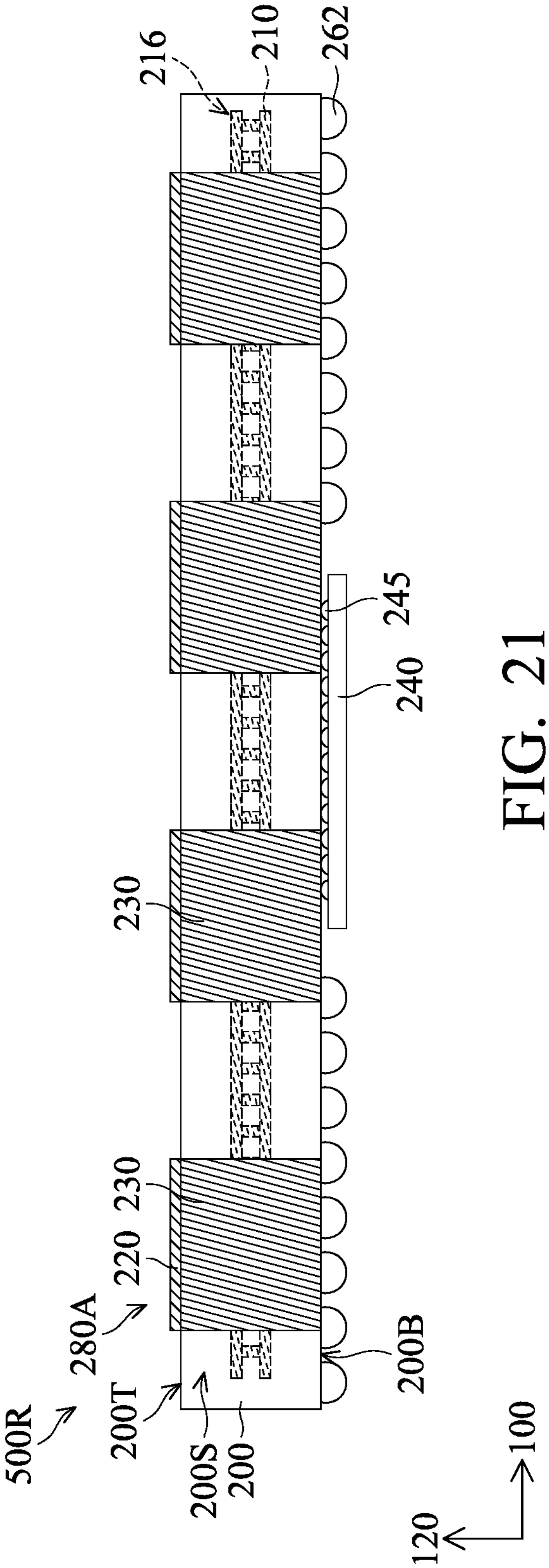

FIG. 21 is a side view of an antenna module 500R along the direction 100 in accordance with some embodiments of the disclosure. The reference numbers the same or similar to those in FIGS. 1, 2, 3A, 3B, 4-11, 12A, 12B, 12C, 13, 14A, 14B, 14C, 15A, 15B and 16-20 denote the same or similar elements. The difference between the antenna module 500R and the antenna module 500Q is that the antenna module 500R includes the electronic component 240 mounted on the antenna package 280A. The electronic component 240 is disposed on the bottom surface 200B of the dielectric substrate 200 of the antenna package 280A. The electronic component 240 is electrically connected to the antennas 220 and 230 through the conductive bump structures 245. The conductive bump structures 262 are formed on the bottom surface 200B of the dielectric substrate 200 and surrounding the electronic component 240. In some embodiments, the size of the conductive bump structures 262 may be greater than the size of the conductive bump structures 245. In this embodiment, the electronic component 240 includes a radio frequency integrated circuit (RFIC), a power management integrated circuit (PMIC) or a passive component such as a resistor, inductor or capacitor.

Figure 22:
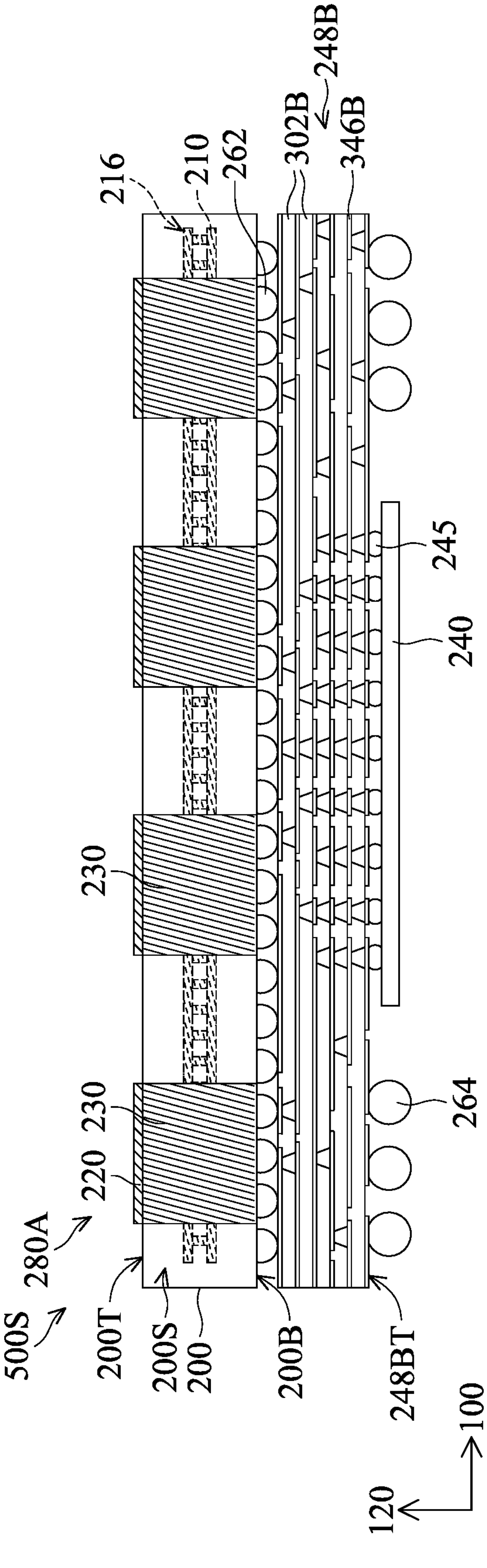

FIG. 22 is a side view of an antenna module 500S along the direction 100 in accordance with some embodiments of the disclosure. The reference numbers the same or similar to those in FIGS. 1, 2, 3A, 3B, 4-11, 12A, 12B, 12C, 13, 14A, 14B, 14C, 15A, 15B and 16-21 denote the same or similar elements. The difference between the antenna module 500S and the antenna module 500Q is that the antenna module 500S further includes the dielectric substrate 248B, the electronic component 240 and at least one conductive bump structure 264. The electronic component 240 is mounted on the surface 248BT of the dielectric substrate 248B and electrically connected to the electrical routings 346B through the conductive bump structures 245. The conductive bump structures 264 are formed on the on the surface 248BT of the dielectric substrate 248B and electrically connected to the electrical routings 346B. In addition, the electronic component 240 is surrounded by the conductive bump structures 264. In some embodiments, the conductive bump structures 245, 262 and 264 may comprise the same or similar structures and materials. The size of the conductive bump structures 264 may be greater than the sizes of the conductive bump structures 245 and 262.

Figure 23:
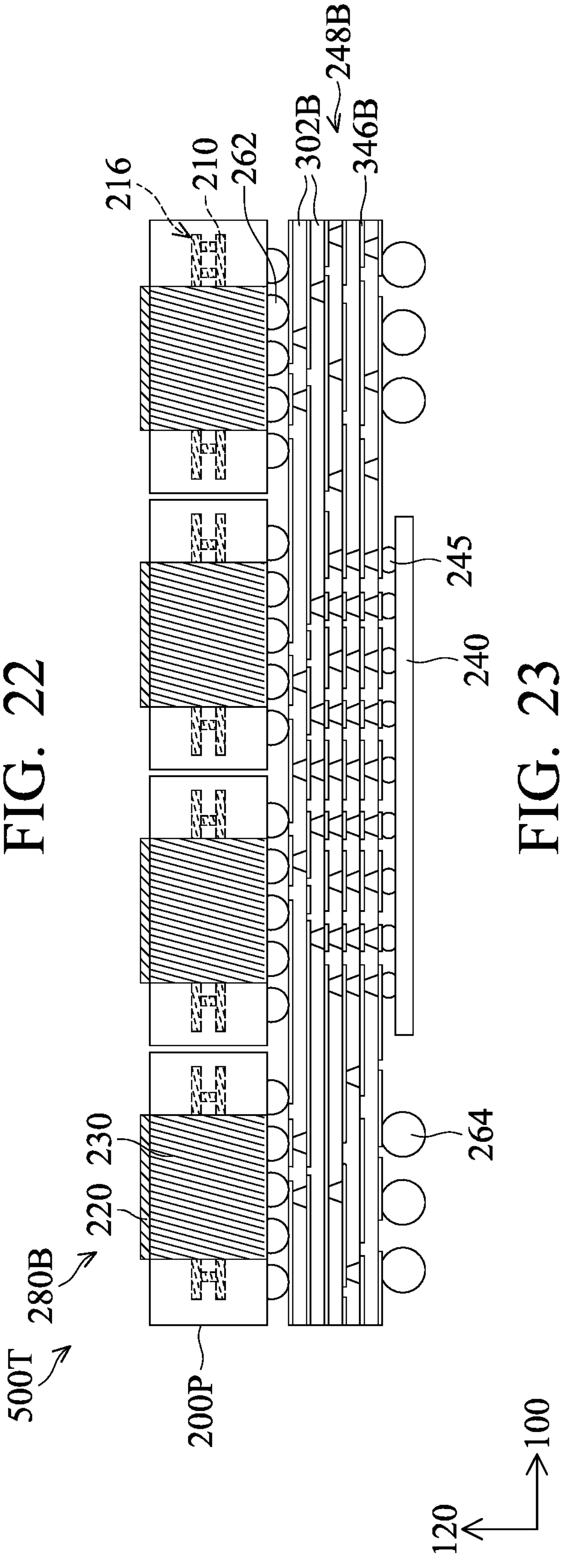

FIG. 23 is a side view of an antenna module 500T along the direction 100 in accordance with some embodiments of the disclosure. The reference numbers the same or similar to those in FIGS. 1, 2, 3A, 3B, 4-11, 12A, 12B, 12C, 13, 14A, 14B, 14C, 15A, 15B and 16-22 denote the same or similar elements. The difference between the antenna module 500T and the antenna module 500S is that the antenna module 500T includes discrete antenna packages 280B arranged side by side and stacked on the dielectric substrate 248B. In this embodiment, the electronic component 240 may individually control each of the antenna packages 280B.

Figure 24:
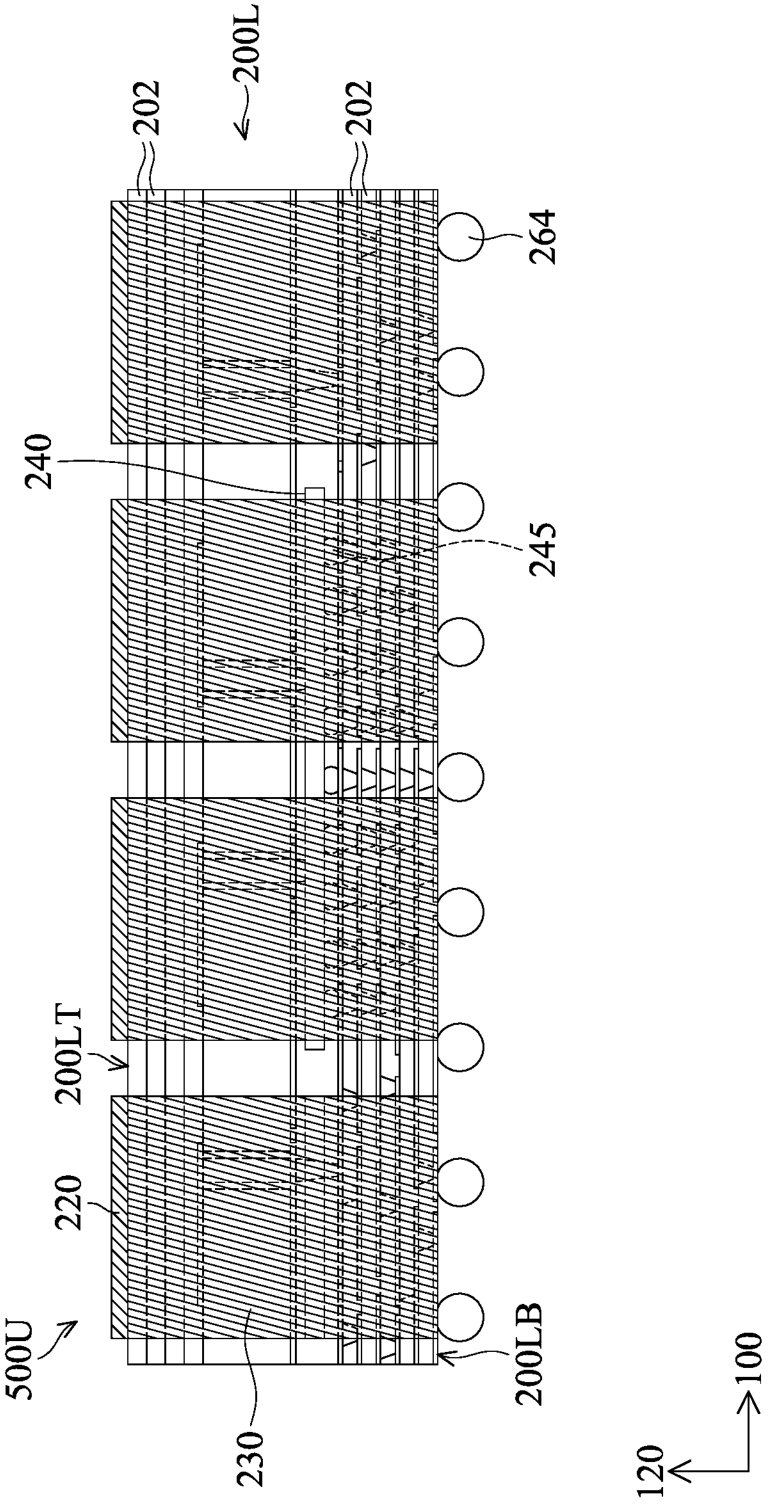

FIG. 24 is a side view of an antenna module 500U along the direction 100 in accordance with some embodiments of the disclosure. The reference numbers the same or similar to those in FIGS. 1, 2, 3A, 3B, 4-11, 12A, 12B, 12C, 13, 14A, 14B, 14C, 15A, 15B and 16-23 denote the same or similar elements. The difference between the antenna module 500U and the antenna module 500L is that the antenna module 500U is a semiconductor package including the dielectric substrate 200L, the antennas 220 and 230, the electronic component 240 and the conductive bump structures 264. In this embodiment, the electronic component 240 is embedded in the dielectric substrate 200L. For illustration of the embedded electronic component 240, the grounding layer 210 and the reflector wall structure 216 is not shown in FIG. 24.

In some embodiments, the dielectric substrate 200L is a multi-layered package substrate including the stacked dielectric layers 202 made by same or different materials and having same or different thicknesses. The dielectric substrate 200L includes electrical routings 246 composed of conductive layers and vias (not shown) formed in the dielectric substrate 200L for electrical connections. The antenna 220 is formed on the top surface (i.e. the top surface 200LT) of the topmost dielectric layer 202. The electronic component 240 is disposed between the topmost dielectric layer 202 and the lower dielectric layer 202 and electrically connected to the electrical routings 246. In addition, the conductive bump structures 264 are formed on the bottom surface 200LB of the dielectric substrate 200L and electrically connected to the electrical routings 246.

Figure 25:
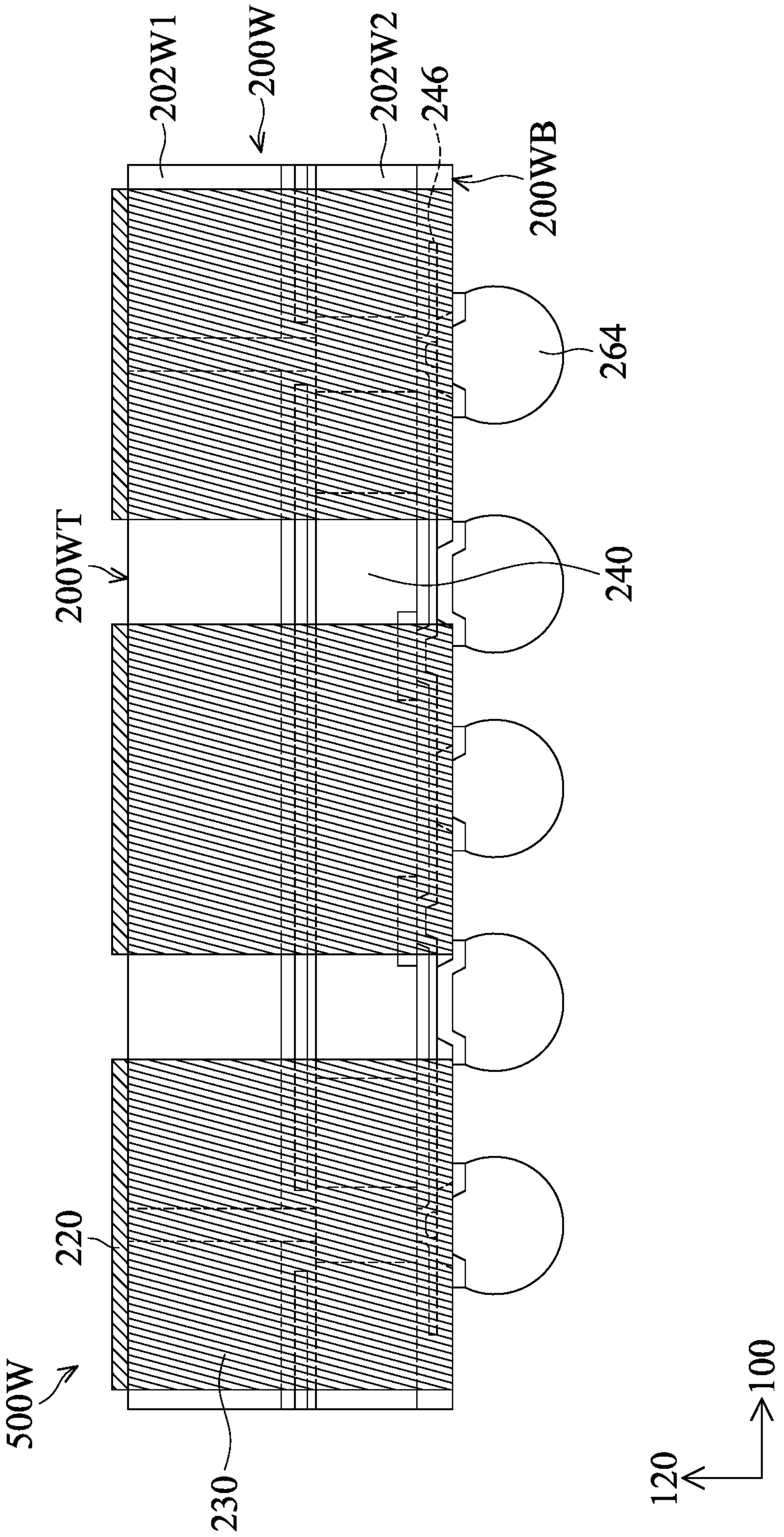

FIG. 25 is a side view of an antenna module 500W along the direction 100 in accordance with some embodiments of the disclosure. The reference numbers the same or similar to those in FIGS. 1, 2, 3A, 3B, 4-11, 12A, 12B, 12C, 13, 14A, 14B, 14C, 15A, 15B and 16-24 denote the same or similar elements. The difference between the antenna module 500W and the antenna module 500U is that the antenna module 500W is a semiconductor package including a dielectric substrate 200W, the antennas 220 and 230, the electronic component 240 and the conductive bump structures 264. In this embodiment, the electronic component 240 is embedded in the dielectric substrate 200W.

In some embodiments, the dielectric substrate 200W is a multi-layered package substrate composed of a dielectric layer 202W1 and a dielectric layer 202W2 below the dielectric layer 202W1. The dielectric layer 202W1 and the dielectric layer 202W2 may be made by same or different materials and having same or different thicknesses. The antenna 220 is formed on a top surface 200WT of the dielectric layer 202W1. In addition, the electronic component 240 is embedded in the dielectric layer 202W2. In some other embodiments, the dielectric layer 202W2 includes a molding compound. As shown in FIG. 25, the conductive bump structures 264 are formed on a bottom surface 200WB of the dielectric substrate 200W and electrically connected to the electrical routings 246.

Figure 26:
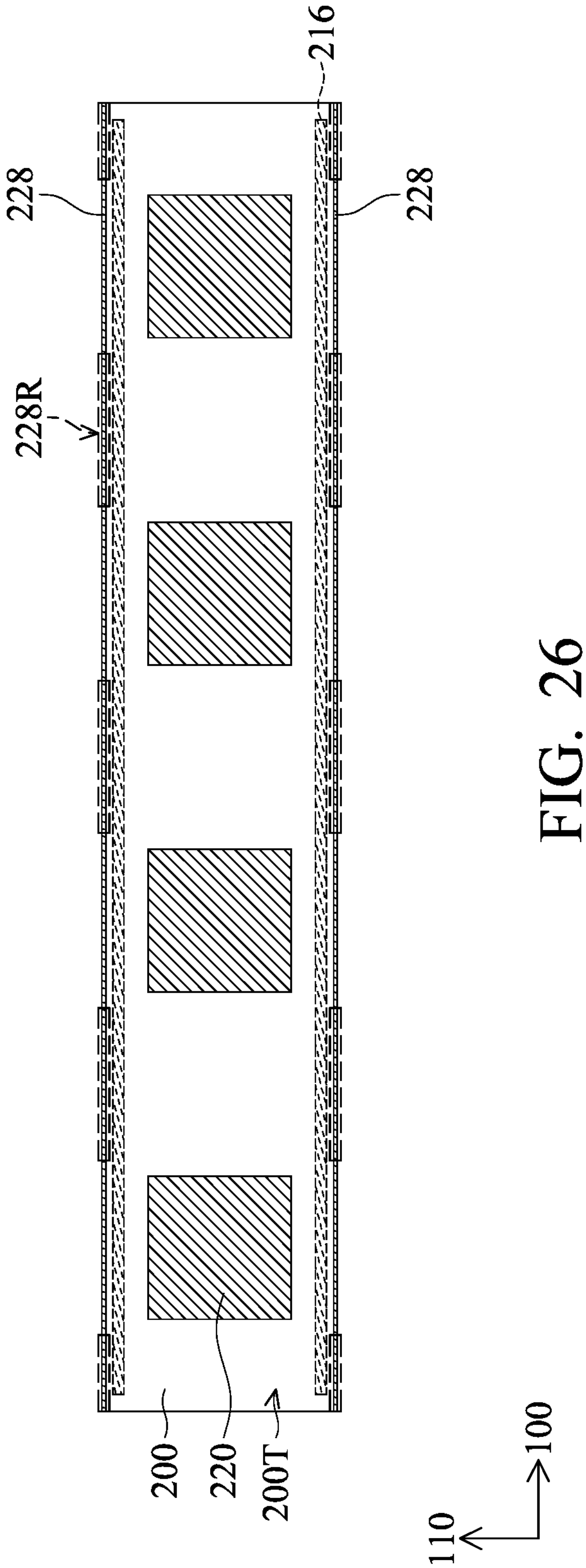
FIG. 26 is a top view of an intermediate stage of a method for manufacturing an antenna module in accordance with some embodiments of the disclosure.

FIG. 26 is a top view of an intermediate stage of a method for manufacturing the antenna module 500 in accordance with some embodiments of the disclosure. The method focuses on the processes for forming the antennas 230 of the antenna module 500. As shown in FIG. 26, the dielectric substrate 200 is provided. The grounding layer 210 (FIG. 3A) and the reflector wall structure 216 are formed in the dielectric substrate 200. And the antennas 220 are formed on the top surface 200T of the dielectric substrate 200. Next, a conductive layer 228 is formed on the side surfaces 200S of the dielectric substrate 200 using plating, sputtering or spraying. Next, a removal processes is performed to remove portions 228R of the conductive layer 228 to from the antennas 230 (FIG. 1) on the side surfaces 200S of the dielectric substrate 200, and the antenna module 500 (FIG. 1) is formed. In some embodiments, the removal processes includes laser polishing, drilling, or another applicable process.

Figure 27:
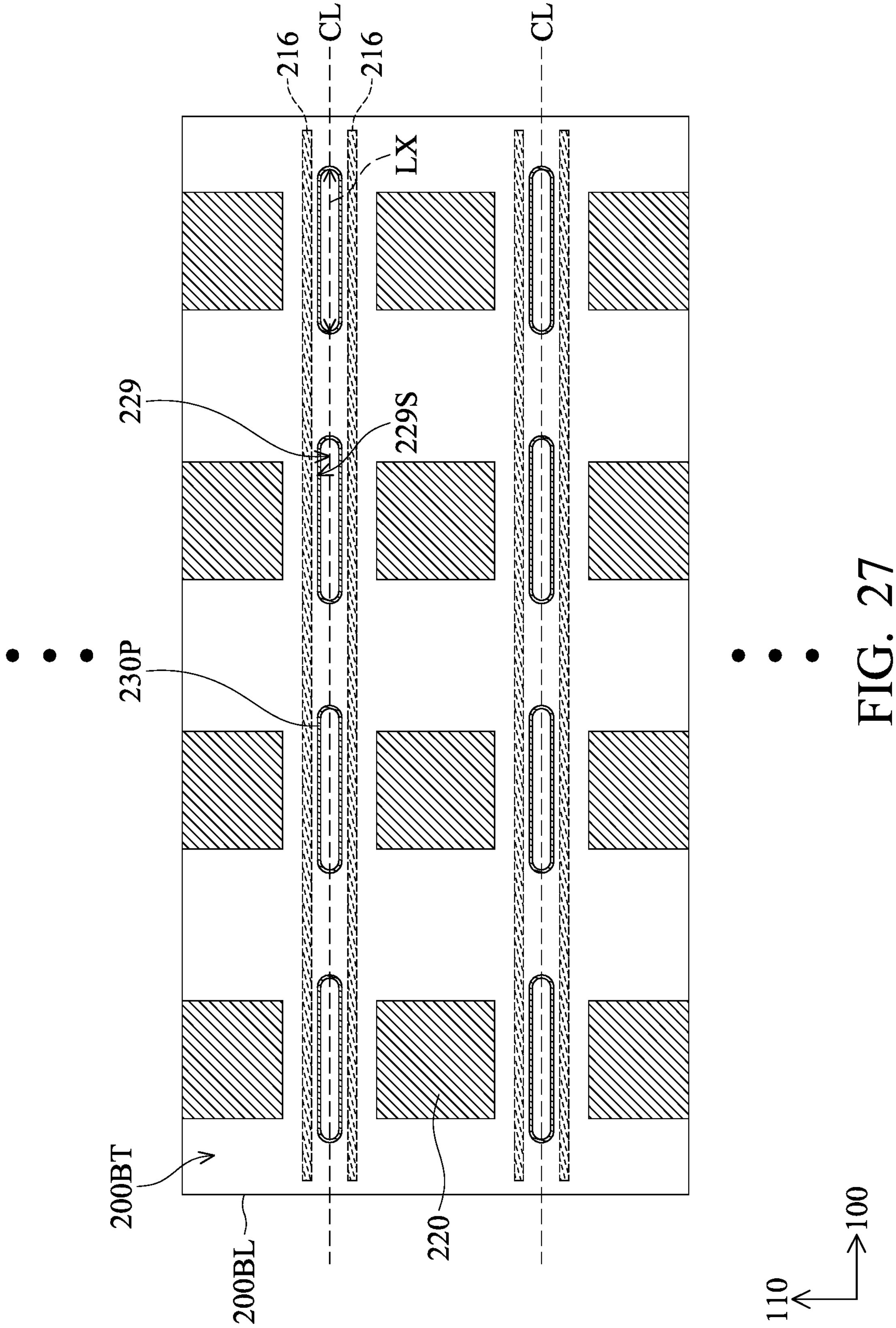
FIG. 27 is a top view of an intermediate stage of a method for manufacturing an antenna module in accordance with some embodiments of the disclosure.

FIG. 27 is a top view of an intermediate stage of a method for manufacturing the antenna module 500 in accordance with some embodiments of the disclosure. The method focuses on the alternative processes for forming the antennas 230 of the antenna module 500. As shown in FIG. 27, a dielectric substrate 200BL is provided. In some embodiments, the dielectric substrate 200BL is provided for manufacturing a plurality of the antenna modules 500 and having scribe lines CL along the direction 100 to define the region of each antenna modules 500. In addition, the grounding layer 210 (FIG. 3A) and the reflector wall structures 216 of each resulting antenna module 500 are formed in the dielectric substrate 200BL. The reflector wall structures 216 are formed close to the scribe lines CL. And the antennas 220 are formed on the top surface 200T of the dielectric substrate 200BL and arranged in an array of n×m, wherein n is integer equal to or greater than one, and m is integer equal to or greater than one. In some embodiments, the dielectric substrate 200BL has holes 229 formed along the scribe lines CL and passing through the dielectric substrate 200BL from a top surface 200BT to a bottom surface (which is the surface that is opposite the top surface 200BT and covered by the top surface 200BT in the top view shown in FIG. 27) of the dielectric substrate 200BL. The holes 229 are arranged along the scribe lines CL and between the reflector wall structures 216 to define the position of the resulting antennas 230. In addition, the hole 229 has a long axis LX along the direction 100 that overlaps the corresponding scribe line CL in the top view shown in FIG. 27. In some embodiments, the holes 229 are formed by drilling or another suitable removal process.

Next, a conductive material (not shown) is formed covering inner walls 229S of the holes 229 to form conductive features 230P in the dielectric substrate 200BL and extending from the top surface 200BT to the bottom surface of the dielectric substrate 200BL. In some embodiments, the conductive features 230P are conformally formed on the inner walls 229S of the holes 229 by plating or another applicable coating process. In some embodiments, the conductive features 230P are formed filling the holes 229 by inserting conductive coins (or conductive pillars) into the holes 229.

Next, the dielectric substrate 200BL is diced along the scribe lines CL which is the same as the long axis LX of the hole 229 in the top view shown in FIG. 27 to form the antennas 230 (FIG. 1) on the side surfaces 200S of the diced dielectric substrate (i.e. the substrate 200), and the antenna module 500 (FIG. 1) is formed.

Figure 28:
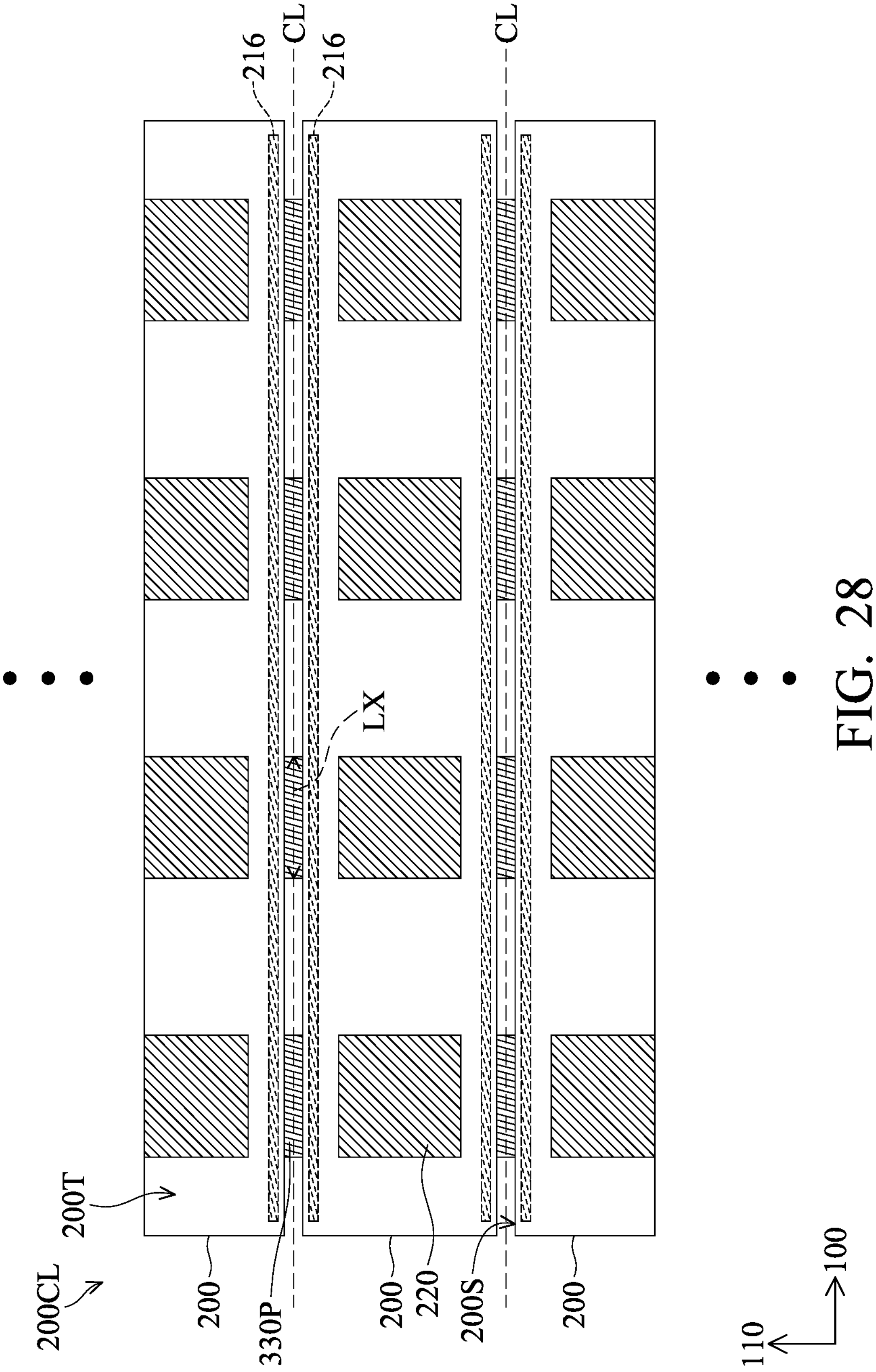
FIG. 28 is a top view of an intermediate stage of a method for manufacturing an antenna module in accordance with some embodiments of the disclosure.

FIG. 28 is a top view of an intermediate stage of a method for manufacturing the antenna module 500 in accordance with some embodiments of the disclosure. The method focuses on the alternative processes for forming the antennas 230 of the antenna module 500. As shown in FIG. 28, a dielectric substrate 200CL is provided. In some embodiments, the dielectric substrate 200BL is provided for manufacturing a plurality of the antenna modules 500. The dielectric substrate 200CL includes a plurality of the dielectric substrates 200. In addition, the grounding layer 210 (FIG. 3A) and the reflector wall structures 216 of each resulting antenna module 500 are formed in each of the dielectric substrates 200. And the antennas 220 are formed on the top surface 200T of each of the dielectric substrates 200. The dielectric substrates 200 are arranged side by side. The dielectric substrate 200BL further includes conductive features 330P embedded in portions of adjacent two dielectric substrates 200 and connected to the side surfaces 200S of adjacent two dielectric substrates 200. The positions of the conductive features 330P are corresponding to the positions of the resulting antennas 230. In addition, the conductive features 330P are electrically connected to the electrical routings of the corresponding dielectric substrates 200.

Next, the dielectric substrate 200CL is diced along the scribe line CL which is the same as the long axis of the conductive features 330P in the direction 100 to form the antennas 230 (FIG. 1) on the side surfaces 200S of the diced dielectric substrates 200, and the antenna module 500 (FIG. 1) is formed.

Embodiments provide an antenna module. The antenna module includes a first antenna (e.g. the broadside antenna) and a second antenna (e.g. the edge fire antenna) respectively formed on the top surface and the side surface of the dielectric substrate (the antenna substrate). Compared with the conventional broadside antenna module (the antennas formed on the top surface of the dielectric substrate only). The antenna module has two different radiation directions of the radio waves from the antennas without increasing its size (the volume of the antenna substrate). Comprised with the conventional dual antenna module (including the broadside antenna and the edge fire antenna both formed on the same surface of the antenna substrate or on different portions of the bending substrate), the antenna module has reduced size. Therefore, the manufacturing cost can be reduced. In addition, the second antennas (e.g. the edge fire antenna) can be formed the opposite side surfaces of the dielectric substrate, so that the coverage area of the antenna module can be increased. The performance of the antenna module can be improved. Further, the antenna module can be widely implemented on the semiconductor bonding technology (SBT) and the processes for manufacturing a semiconductor package.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna module, comprising:

a first dielectric substrate having a top surface, a bottom surface and a first side surface between the top surface and the bottom surface;

a first antenna formed on the top surface of the first dielectric substrate;

a second antenna formed on the first side surface of the first dielectric substrate;

a grounding layer disposed in the first dielectric substrate and below the first antenna; and a reflector wall structure fully embedded in the first dielectric substrate and electrically connected to the grounding layer, wherein the reflector wall structure extends parallel to the first side surface and between the top surface and the bottom surface without extending outside or onto the top surface and the bottom surface.

2. The antenna module as claimed in claim 1, wherein the reflector wall structure extends parallel to the first side surface and between the top surface and the bottom surface, wherein the reflector wall structure comprises:

vias disposed on the grounding layer and arranged as a row close to the first side surface; and a first conductive line covering and electrically connected to the vias.

3. The antenna module as claimed in claim 1, wherein the first antenna radiates signals at a first direction, and the second antenna radiates signals at a second direction different from the first direction.

4. The antenna module as claimed in claim 1, wherein the second antenna is operated in a first frequency band and a second frequency band that is different from the first frequency band, wherein the second antenna has a first dimension along a first direction and a second dimension along a second direction.

5. The antenna module as claimed in claim 4, wherein the first dimension is equal to a half wavelength corresponding to the center frequency of the first frequency band, and the second dimension is equal to a half wavelength corresponding to the center frequency of the second frequency band.

6. The antenna module as claimed in claim 1, further comprising:

a third antenna formed on the side surface and beside the second antenna, wherein the second antenna is operated in a first frequency band and the third antenna is operated in a second frequency band that is different from the first frequency band, wherein the second antenna has a first dimension along a first direction, wherein the third antenna has a second dimension along the first direction, wherein the first dimension is different from the second dimension.

7. The antenna module as claimed in claim 6, wherein the second antenna and the third antenna are arranged along a second direction vertical to the top surface.

8. The antenna module as claimed in claim 6, wherein the second antenna and the third antenna are arranged in a staggered manner along the first direction parallel to the top surface.

9. The antenna module as claimed in claim 1, wherein the antenna module comprises a pair of second antennas, wherein the antenna module further comprises:

a passive component disposed inside the dielectric substrate, wherein the passive component are electrically connected to the pair of second antennas, wherein the passive component and the pair of second antennas collectively form a first composite antenna, wherein the second antenna is operated in a first frequency band and the first composite antenna is operated in a second frequency band that is different from the first frequency band.

10. The antenna module as claimed in claim 1, wherein the antenna module comprises a pair of second antennas, wherein the antenna module further comprises:

a feeding line disposed inside the dielectric substrate and electrically connected to adjacent terminals of the pair of second antennas, wherein the feeding line and the pair of second antennas collectively form a second composite antenna, wherein the second antenna is operated in a first frequency band and the second composite antenna is operated in a second frequency band that is different from the first frequency band.

11. The antenna module as claimed in claim 1, wherein the second antenna comprises:

a pair of antenna portions; and a pair of conductive lines disposed inside the dielectric substrate and respectively close to the top surface and the bottom surface, wherein the pair of conductive lines are electrically connected to the pair of antenna portions, wherein a slot surrounded by the pair of conductive lines and the pair of antenna portions form the second antenna.

12. The antenna module as claimed in claim 1, wherein the dielectric substrate further comprises a second side surface adjacent to the first side surface, wherein the first side surface is not aligned with the second side surface.

13. The antenna module as claimed in claim 1, further comprising:

a conductive sheet disposed on the bottom surface of the first dielectric substrate and extending along a direction vertical to the bottom surface of the first dielectric substrate, wherein the conductive sheet is electrically connected to the second antenna.

14. The antenna module as claimed in claim 1, further comprising:

an electronic component disposed on the bottom surface of the first dielectric substrate, wherein the electronic component is electrically connected to the first antenna and the second antenna.

15. The antenna module as claimed in claim 14, further comprising:

a connector disposed on the bottom surface of the first dielectric substrate and beside the electronic component, wherein the connector is electrically connected to the electronic component.

16. The antenna module as claimed in claim 15, further comprising:

a molding compound covering the electronic component but not covering the connector.

17. The antenna module as claimed in claim 16, wherein the first dielectric substrate, the first antenna, the second antenna, the electronic component, the connector and the molding compound collectively form an antenna package.

18. The antenna module as claimed in claim 15, further comprising:

a second dielectric substrate disposed between the bottom surface of the first dielectric substrate and the electronic component.

19. The antenna module as claimed in claim 18, wherein the connector and the second dielectric substrate overlap different portions of the bottom surface of the first dielectric substrate.

20. The antenna module as claimed in claim 18, wherein the second dielectric substrate is disposed between the bottom surface of the first dielectric substrate and the connector.

21. The antenna module as claimed in claim 18, wherein the first dielectric substrate, the first antenna and the second antenna collectively form an antenna package, wherein the electronic component, the molding compound and the second dielectric substrate collectively form a semiconductor package, wherein the antenna package is mounted on the semiconductor package.

22. The antenna module as claimed in claim 1, further comprising:

an electronic component embedded in the first dielectric substrate.

23. The antenna module as claimed in claim 22, wherein the first dielectric substrate is composed of a first dielectric layer and a second dielectric layer below the first dielectric layer, wherein the first antenna is formed on a top surface of the first dielectric layer, and the electronic component is disposed between the first dielectric layer and the second dielectric layer.

24. The antenna module as claimed in claim 22, wherein the first dielectric substrate is composed of a first dielectric layer and a second dielectric layer below the first dielectric layer, wherein the first antenna is formed on a top surface of the first dielectric layer, and the electronic component is embedded in the second dielectric layer.

25. A method for manufacturing an antenna module, comprising:

providing a dielectric substrate having a top surface and a bottom surface and a side surface between the top surface and the bottom surface;

forming a first antenna on the top surface of the dielectric substrate;

forming a conductive layer covering the entire side surface;

removing a portion of the conductive layer to form a second antenna on the side surface of the dielectric substrate;

forming a grounding layer in the dielectric substrate and below the first antenna; and forming a reflector wall structure fully embedded in the dielectric substrate and electrically connected to the grounding layer, wherein the reflector wall structure extends parallel to the first side surface and between the top surface and the bottom surface without extending outside or onto the top surface and the bottom surface.

* * * * *